United States Patent [19]

Magnus et al.

[11] Patent Number: 4,526,908
[45] Date of Patent: Jul. 2, 1985

[54] POLYOL BLENDS OF PHTHALATE/TRIMELLITATE ESTERS FOR POLYURETHANE-POLYISOCYANURATE FOAMS

[75] Inventors: George Magnus, Arlington Heights; Norman Smith, Lake Forrest; Bonnie Keyes, Chicago, all of Ill.

[73] Assignee: Stepan Company, Northfield, Ill.

[21] Appl. No.: 619,134

[22] Filed: Jun. 14, 1984

Related U.S. Application Data

[63] Continuation-in-part of Ser. No. 541,928, Oct. 18, 1983, abandoned, which is a continuation-in-part of Ser. No. 381,299, May 24, 1982, abandoned.

[51] Int. Cl.$^3$ .............................................. C08G 18/14
[52] U.S. Cl. .................................. 521/172; 521/118; 521/112; 560/89; 560/91
[58] Field of Search ................... 521/172, 118, 112; 560/89, 91

[56] References Cited

U.S. PATENT DOCUMENTS

| | | | |
|---|---|---|---|
| 3,459,733 | 8/1967 | Byrd et al. | 560/91 |
| 3,505,377 | 4/1970 | Morehouse | 556/445 |
| 3,563,924 | 2/1971 | Schwarz | 521/112 |
| 4,018,815 | 4/1977 | Vogt et al. | 560/198 |
| 4,347,330 | 8/1982 | Demou et al. | 521/112 |

OTHER PUBLICATIONS

Article by H. E. Reymore, R. J. Lockwood, and H. Ulrich entitled "Novel Isocyanurate Foams Containing No Flame Retardant Additives", published in Nov./Dec. 1978, in *Journal of Cellular Plastics* at pp. 332–340.

*Primary Examiner*—John Kight
*Assistant Examiner*—Marvin L. Moore
*Attorney, Agent, or Firm*—Hill, Van Santen, Steadman & Simpson

[57] ABSTRACT

Homogenous liquid polyol blend compositions containing (a) certain aliphatic polyols, (b) phthalate diester polyols of said aliphatic polyols, and (c) trimellitate polyols of said aliphatic polyols. Such polyol blend compositions are useful in making homogenous liquid resin prepolymer blends compositions containing, in addition to such a polyol blend, fluorocarbon blowing agent, cell stabilizing surfactant, and urethane and/or isocyanurate catalyst. Such a resin prepolymer blend composition is suitable for reaction with organic isocyanates to produce cellular polyurethane and/or polyisocyanurate polymers.

13 Claims, No Drawings

4,526,908

POLYOL BLENDS OF PHTHALATE/TRIMELLITATE ESTERS FOR POLYURETHANE-POLYISOCYANURATE FOAMS

RELATED APPLICATION

This application is a continuation-in-part of our earlier filed U.S. patent application Ser. No. 541,928, filed Oct. 18, 1983, now abandoned which in turn is a continuation-in-part of our earlier filed U.S. patent application Ser. No. 381,299, filed May 24, 1982, now abandoned.

BACKGROUND OF THE INVENTION

1. Field of the Invention

The invention relates to intermediate polyol blends, to resin prepolymer compositions incorporating such polyol blends, to cellular polyurethane-polyisocyanurate polymers made from such polyol blends and such resin compositions by reaction thereof with isocyanates, and to processes for the preparation of such respective blends, compositions, and cellular polymers.

2. Description of the Prior Art

Cellular polyurethane and polyisocyanurate polymers are well known in the art particularly for use in various types of thermal insulating applications. Such polymers are manufactured by reacting polyfunctional organic isocyanates with polyfunctional compounds containing free hydroxyl groups (e.g., polyols) in the presence of a blowing agent and (usually) a catalyst.

Because of the relatively high cost of polyols useful in making cellular polymers, efforts have been heretofore made to find polyols adapted for chemical conversion into such cellular polymers which are as low cost as possible. Because of a tendency for lower cost polyols to produce product foams of less than desired properties, it has become commonplace to prepare and utilize blends of different polyols for reaction with organic polyisocyanates to produce product foams having the desired combinations of properties. Thus, through the use of polyol blends, product foam problems can be avoided, such as lack of uniform core and adjacent substrate, excessive foam friability, and the like. The polyol blends typically are compounded with other additives including fluorocarbon blowing agents to produce so-called resin prepolymer blend compositions which are ready for admixture with (and reaction with) organic isocyanates to produce cellular polyurethane-polyisocyanurate polymers by the reaction that results.

The blending of aromatic polyester polyols, including aromatic polyester diols, can result in compounding problems and in product quality problems. For example, when fluorocarbon blowing agents are employed in resin blends containing aromatic polyester polyols, incompatibility problems may arise between the polyol blend or system and the fluorocarbon blowing agent. Similar problems can arise between such a polyol blend and the isocyanate catalyst system used for achieving a desired reaction between such polyols and isocyanates.

Because of blendability and product foam quality considerations, there are not many commercially suitable low cost polyester polyols available. One class of such polyols which has heretofore been employed in this art comprises reaction products of a low molecular weight polyether polyol, such as diethylene glycol, with poly(carbomethoxy-substituted) diphenyls and benzyl esters. Such products are available commercially under the trademarks "Terates" from Hercules Inc. and "Urol 11" from UCT, Inc. Such diphenyl and benzyl ester diethylene glycol products are commercially used at rates ranging up to about 15 to 20 weight percent of a polyol blend (based on total blend weight) in making cellular products in the rigid foam urethane industry.

There remains in this art a need for new and low cost polyester polyol blends which can be incorporated into resin prepolymer compositions for use in the manufacture of cellular polyurethane-polyisocyanurate polymers of commercial quality.

SUMMARY OF THE INVENTION

The present invention concerns in one aspect a new and very useful class of liquid polyester polyol blend compositions which are suitable for making polyurethane-polyisocyanurate polymers. These blend compositions can be compounded into so-called resin prepolymer compositions which can be admixed and reacted with isocyanates to produce cellular polyurethane-polyisocyanurate polymers. This invention further concerns such resin prepolymer compositions and such cellular polymers formed therefrom. Methods for making and using such blend compositions and resin prepolymer compositions are also provided.

These polyol blend compositions are comprised of certain esterified mixtures of phthalic acid (or phthalic anhydride) and trimellitic acid (or trimellitic anhydride) with certain aliphatic polyols (especially diols and triols).

These polyester polyol blend compositions surprisingly and unexpectedly can be used, particularly when compounded with other ingredients as taught herein, to produce cellular polyurethane-polyisocyanurate polymers of commercial quality and suitability yet such blend compositions can be simply and economically produced. Such compositions appear to be unexpectedly more effective in producing such polymers than are the individual blend components under comparable conditions.

Thus, the present polyester polyol blend compositions as prepared by the teachings of this invention enable one to prepare liquid resin prepolymer compositions which, when mixed and reacted with isocyanates, produce product cellular polyurethane-polyisocyanurate polymers which have properties that are different from the properties which are achievable when using, for example, as the starting polyester polyol, substantially only a phthalate polyester polyol formed from esterifying phthalic anhydride or phthalic acid with the same aliphatic polyol(s) which are herein below identified in formula (1). Such property differences are believed to be desirable in order to be able to make from a phthalate based polyester polyol a series of liquid resin prepolymer compositions that can, in turn, be mixed and reacted with isocyanates to produce cellular polymers of controllable and variable properties, such as is desired for many commercial end use applications of urethane and isocyanurate cellular polymers. For one example, by increasing the relative weight percentage of trimellitate containing condensates of aliphatic polyol of formula (1) as herein below defined (preferably diethylene glycol) relative to the weight percentage of phthalate containing condensates of diethylene glycol in a given polyol blend (or a resin blend made therefrom) made according to the teachings of this invention, progressive changes in product foam compressive strength and dimensional stability are observable as illustrated in the Embodiments below. Such controllable variations in properties in a product foam made from comparable resin blends containing only phthalate condensates of diethylene glycol with do not appear to be possible.

Also, the present polyester polyol blend compositions of this invention as prepared by the teachings of this invention display unexpectedly greater fluorocarbon solubility (compatibility) than is obtainable with comparable compositions prepared by separately reacting each of (1) phthalic anhydride or phthalic acid with such aliphatic polyol(s) and (2) trimellitic anhydride or trimellitic acid with such aliphatic polyol(s) and then thereafter blending together such separately prepared polyester polyols to produce blend mixtures containing preselected relative proportions of phthalic containing condensates and trimellitate containing condensates. The higher fluorocarbon solubility characteristics associated with the polyol blends of this invention are believed to be an important feature thereof in prepared resin prepolymer blends.

Although polyester polyol blends of the present invention can be very complex in composition, particularly when a starting aromatic carboxylic acid mixture as described herein is reacted with polyfunctional aliphatic polyol mixture, the polyester polyol blends of this invention provide a desirable ability to controllably change product polyol blend compositional characteristics and thereby enhance the ability to produce resin prepolymer blend compositions that permit systematic variations in product foams to be achieved.

Characteristically, a polyol blend of this invention is in the physical form of a uniform, homogeneous liquid (at ambient temperatures and pressures) having an acid number in the range from about 2 to 7 and an hydroxyl number in the range from about 200 to 600. Such a liquid is characteristically colored (typically a dark color, even black).

Such a polyol blend comprises on a 100 weight percent total polyol blend basis:

(A) from about 2 to 25 weight percent of at least one (unreacted) aliphatic polyol compound of the generic formula:

$$HO-R^1-OH \quad (1)$$

wherein $R^1$ is a divalent radical selected from the group consisting of:

(a) alkylene radicals each containing from two through six carbon atoms, (b) radicals of the formula:

$$-CH_2-R^2-CH_2-$$

$R^2$ is a radical selected from the group consisting of:

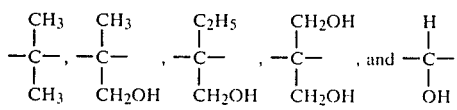

(c) radicals of the formula:

$$-(R^3O)_n-R^3-$$

$R^3$ is an alkylene radical containing from 2 through 3 carbon atoms and n is an integer of from 1 through 3, (B) from about 50 to 95 weight percent of phthalate condensates of said aliphatic polyol with aromatic dicarboxylic acid material selected from the group consisting of phthalic acid and phthalic acid anhydride, and (C) from about 5 to 35 weight percent of trimellitate condensates of said aliphatic polyol with aromatic tricarboxylic acid material selected from the group consisting of trimellitic acid and trimellitic acid anhydride.

Diethylene glycol is a preferred such aliphatic polyol. In any given such polyol blend, when the aliphatic polyol is diethylene glycol, preferably:

(1) of said phthalate condensates, at least about 15 weight percent thereof on a 100 weight percent total polyol blend basis are comprised of a total of (a) esters wherein the combined mole ratio of said aromatic dicarboxylic acid material to said aliphatic polyol is 1:1;

(b) esters wherein the combined mole ratio of said aromatic dicarboxylic acid material to said aliphatic polyol is 1:2;

(c) esters wherein the combined mole ratio of said aromatic dicarboxylic acid material to said aliphatic polyol is 2:3; and (2) of said trimellitate condensates at least about 15 weight percent thereof on a 100 weight percent total polyol blend basis are comprised of a total of (a) esters wherein the combined mole ratio of said aromatic tricarboxylic acid material to said aliphatic polyol is 1:1;

(b) esters wherein the combined mole ratio of said aromatic tricarboxylic acid material to said aliphatic polyol is 1:2;

(c) esters wherein the combined mole ratio of said aromatic tricarboxylic acid material to said aliphatic polyol is 1:3; and (3) at least about 5 weight percent of said phthalate condensates and at least about 5 weight percent of said trimellitate condensates, all on a 100 weight percent total polyol blend basis, are comprised of oligomers of said aliphatic polyol with said dicarboxylic acid material, said tricarboxylic material, and mixtures thereof.

Such a homogeneous liquid polyol blend composition prepared by heating a starting blend comprised on a 100 wt % total blend basis of (A) from about 50 to 95 weight percent of aromatic dicarboxylic acid material selected from the group consisting of phthalic acid anhydride and phthalic acid; and (B) from about 5 to 35 weight percent of an aromatic tricarboxylic acid material selected from the group consisting of trimellitic acid anhydride and trimellitic acid with at least one aliphatic polyol having the generic formula:

$$HO-R^1-OH$$

wherein $R^1$ is as above defined.

The initial mole ratio of said aliphatic polyol to said blend is in the range from about 1.9 to 4.

Such heating is conducted under liquid phase conditions at a temperature ranging from about 150° to 250° C. until the resulting product mixture reaches a desired hydroxyl number in the range from about 190 to 600 and the desired acid number in the range from about 0.01 to 7.

Typically, in any given such product polyol blend composition, the total weight percent of said phthalic condensates and said (unreacted) aliphatic polyol is at least about 65 weight percent of a total such product polyol blend, and the total weight of said phthalate condensates and said trimellitate condensates ranges from about 60 to 98 weight percent. Preferably, in any given product polyol blend composition, the content of acetone insolubles is not above about 15 weight percent of the total such polyol blend, and, more preferably, the total weight percent of acetone insoluble material is not more than about 10 weight percent.

Optionally, a given liquid polyol blend of this invention can contain, in addition to the foregoing components, up to about 12 weight percent of at least one other (third) type of aromatic carboxylic acid ester comprised of the reaction product (condensate) of at least one aliphatic polyol of formula (1) above and an aromatic monocarboxylic acid material selected from the group consisting of benzoic acid and benzoic acid anhydride. Such an aromatic monocarboxylic acid ester material, when present in a product polyol blend, is preferably made in the esterification reaction so that, in effect, such an aromatic monocarboxylic acid material is present in a starting mixture blend in an amount ranging from 0 to about 12 weight percent (total blend basis).

Particularly because of the starting materials and techniques used to make the polyol blend compositions of this invention, sometimes minor amounts generally less than about 15 weight percent of a total product polyol blend of another or other components in addition to those above described is (are) present in such a polyol blend composition.

Typically, the weight ratio of total phthalate condensates to total trimellitate condensates in such a polyol blend composition ranges from about 90:10 to 65:35, and more preferably from about 85:15 to 70:30.

One presently preferred type of homogeneous liquid polyol blend composition of this invention comprises on a 100 weight percent total blend basis:
(i) from about 3 to 15 weight percent of said aliphatic polyol,
(ii) from about 55 to 93 weight percent of said phthalate condensates,
(iii) from about 8.5 to 33 weight percent of said trimellitate condensates, and
(iv) from 0 to about 2 weight percent of said total benzoate condensates.

Such a liquid polyol blend composition preferably contains not more than about 10 weight percent of other (presently) unknown acetone insoluble components.

In another aspect, the present invention concerns liquid homogeneous resin prepolymer blend compositions which incorporate a polyol blend composition of this invention and which are adapted for reacting with organic isocyanates to make cellular polyurethane-polyisocyanurate polymers. Such resin prepolymer compositions comprise a combination of (a) above indicated polyol blend composition(s) of this invention, (b) emulsifier surfactant system, (c) a urethane and/or isocyanurate catalyst system, and (d) fluorocarbon blowing agent.

In another aspect, the present invention concerns cellular foams produced by reacting such a polyol blend composition, and/or such a resin prepolymer blend composition, as described above with at least one organic isocyanate.

The resin prepolymer blend compositons of this invention can be prepared by any desired procedure(s), and these resin prepolymer blend compositions can be reacted with isocyanates by conventional procedures to produce cellular foam products. However, for presently unknown reasons, the only known method of making the polyol blends of this invention involves esterification with a formula (1) polyol of a preformed mixture of phthalic and trimellitic anhydrides (or acids). Such starting mixtures appear to result in esters in a product polyol blend which are more easily blended with other components of the types which are used in resin prepolymer blend compositions of this invention. For example, fluorocarbon blowing agent solubility seems to be better in polyol blends of this invention prepared from such preferred mixtures than in polyol blends prepared by separately esterifying phthalic anhydride (or acid) and trimellitic anhydride (or acid) and then blending together such separately prepared esterified systems. In fact, and characteristically, separately prepared such phthalate esters and trimellitate esters (made with aliphatic polyols of formula (1) appear to be characteristically substantially incompatible with flurocarbons for unknown reasons.

By one preferred procedure, for example, the polyol blends of this invention are prepared by using as starting materials process streams directly obtained from the manufacture of phthalic anhydride which streams are esterified as taught herein with formula (1) aliphatic polyol to produce polyester polyol blends of this invention. It may be necessary or desirable to add trimellitic acid or anhydride to such a process stream in order to obtain a desired level of such aromatic tricarboxylic acid material in a starting preformed mixture. Though such preferred procedure appears to offer cost advantages, the product polyol blends so produced are generally complex mixtures that typically contain presently unknown acetone insoluble components; as indicated above, the level of such acetone insoluble components is preferably kept below about 15 weight percent (total blend basis) in product polyol blends of this invention.

Product polyol blends are, if desired, compoundable with other components, including especially other and separately prepared polyester polyols, to produce other polyester polyol blends of this invention and/or the resin prepolymer blends of this invention.

The polyol blend compositions of this invention, and the resin prepolymer blend compositions of this invention, advantageously can be used as the polyol ingredients for isocyanate reaction in the preparation of rigid polyurethane-polyisocyanurate foams for use in a wide variety of applications, including thermal and sound insulation for industrial and residential buildings. Alternatively or additionally, as desired, the polyol blends of this invention can be utilized as minor (e.g., less than about 50 weight percent) constituents in the preparation of polyurethane or polyisocyanurate foams. For example, a polyol blend composition can be compounded with other polyols into a resin prepolymer blend composition which can then be admixed (and thereby reacted) with organic isocyanates to produce foams such as those foams prepared in conventional foam laminating machinery and by conventional foam spraying equipment. Thus, economical foams are producible which can have excellent heat and burn resistance (flame retardant) properties. These foams advantageously can be prepared using conventional flame retardant and other additives known to the prior art, such as are commonly used in making laminate boards and foam bun stock, both of which products are used, for example, in building construction for thermal and sound insulation.

Polyol blends and resin prepolymer compositions incorporating such polyol blends of this invention can be prepared which reduce the quantities of the expensive prior art halogenated polyols or halogenated phosphates conventionally heretofore employed as flame retardants in making foams, such quantity reductions being achieved without sacrificing a desired level of flame retarding or burn resistance in a product foam.

Another object is to provide aromatic polyester polyol compositions which can be readily blended with other materials to produce resin prepolymer compositions having excellent storage stability and which can be reacted with isocyanates to produce rigid foams of excellent commercial quality.

Other and further features, objects, aims, advantages, embodiments, and the like associated with the present invention will be apparent to those skilled in the art from the accompanying specification taken with the appended claims.

DETAILED DESCRIPTION

Starting Materials

As indicated above, preformed mixtures of phthalic and trimellitic anhydride (or acids) are employed as starting materials for reaction with aliphatic polyol of formula (1).

Such a preformed mixture can comprise a stream obtained from the manufacture of phthalic anhydride, such as a so-called phthalic anhydride crude, light ends, or bottoms composition. Preferably such a starting acidic mixed composition stream contains such respective contents of unknown acetone insolubles, phthalic anhydride (and/or of phthalic acid), trimellitic anhydride (and/or the corresponding acid), and/or (if present) benzoic anhydride (and/or benzoic acid) that it can be used directly for reaction with formula (1) polyol to produce a product polyol blend composition of this invention as above characterized. However it may be necessary to add to such a starting composition trimellitic anhydride (or acid) or phthalic anhydride (or acid) to make a starting blend having a composition such as above indicated.

For another example, the polyol blend compositions of this invention can be prepared by esterifying a preblended mixture of phthalic acid or anhydride, trimellitic acid or anhydride, and, optionally, benzoic acid or anhydride. Some Isopthalic acid or isophthalic anhydride can be present. The anhydrides are presently preferred. Substantially pure materials are usable and are desirable if available and economically practical. Such a mixture is esterified with formula (1) polyol as taught herein to produce a polyol blend of this invention.

A preferred class of formula (1) starting polyols comprises polyether glycols, or mixtures of polyether glycols with other polyols of formula (1).

Examples of suitable formula (1) polyol starting materials include: glycerine, ethylene glycol, diethylene glycol, propylene glycol, dipropylene glycol, trimethylene glycol, triethylene glycol, tetraethylene glycol, butylene glycols, 1,1,1-trimethylolethane, 1,1,1-trimethylolpropane, pentaerythritol, and also poly(oxyalkylene) polyols in which each repeating unit contains two or three carbon atoms, such a polyol being derived by the condensation of ethylene oxide, propylene oxide and mixtures thereof, and the like. As those skilled in the art will appreciate, in the preparation of mixed poly-(oxyethylene-oxypropylene) polyols, the ethylene and propylene oxides may be added to a starting hydroxyl-containing reactant either in admixture or sequentially. A presently most preferred polyol for reaction with a phthalic anhydride starting material is diethylene glycol.

The above referenced phthalic anhydride streams (crudes, light ends, and bottoms) which can be used as starting materials and which are presently preferred for use in the practice of the present invention result from the known process of converting o-xylene to phthalic anhydride. This process is carried out by the steps of:

(A) contacting in a reaction zone and in the presence of excess oxygen (air) o-xylene of at least about 95 weight percent purity (on a total starting feed basis) with (preferably) a vanadium catalyst under vapor phase conditions involving a temperature ranging from about 360° to 400° C., and a pressure ranging from above 0 to about 10 psig, which temperature and pressure are maintained for a time sufficient to convert theoretically at least about 96 weight percent of the total starting o-xylene to phthalic anhydride;

(B) desubliming the vapor phase product stream from the above contacting to produce a solid material at a temperature typically ranging from about 50° to 70° C. under about atmospheric pressure;

(C) first heating the solid so produced to a temperature not less than about 130° C. which temperature is sufficient to liquify such solid at about atmospheric pressure;

(D) secondly heating the liquid so produced to a temperature ranging from about 270° to 295° C. for a time at least sufficient to convert at least about 99 weight percent of all phthalic acid material in such liquid into phthalic anhydride;

(E) first distilling the resulting liquid at a vapor phase temperature ranging from about 220° to 240° C. while maintaining an absolute pressure in the range from about 250 to 150 mm Hg and collecting and condensing substantially all such first distillate so produced, the first residue being so produced from such first distilling being maintained at a temperature ranging from about 240° to 260° C.; and (F) secondly distilling said first residue at a vapor phase temperature ranging from about 240° to 260° C. while maintaining an absolute pressure in the range from about 250 to 350 mm Hg and collecting and condensing substantially all such second distillate so produced, the second residue being so produced in such second distilling being maintained initially at a temperature ranging from about 260° to 280° C.

The first distillate so produced is known as "light ends" or "phthalic anhydride light ends", while the second distillate so produced comprises substantially pure phthalic anhydride. The second residue so produced is known as "bottoms" or "phthalic anhydride bottoms". The resulting liquid from the second heating is known as "crude" or "phthalic anhydride crude". The first and the second distilling steps can be carried out either batchwise or continuously, as those skilled in the art appreciate. The crude, the light ends and the bottoms can each be regarded as having a somewhat variable composition, such compositional variations being the result of variations in the starting o-xylene feed, and also of variations in the exact conditions employed for the respective process steps. For example, as those skilled in the art will appreciate, in a typical actual commercial-scale phthalic anhydride production plant, the process parameters are so regulated that the composition of a phthalic anhydride bottoms (second residue) falls into a desired or preset range for a constant feedstock of o-xylene.

Therefore, it is very difficult to state the exact compositions of, respectively, all possible crude, light ends and bottoms. Nevertheless, the respective characteristic compositions of, for example, light ends and bottoms are distinctly different from one another. For example, a typical phthalic anhydride crude composition is now believed to be as follows (on a 100 weight percent total composition basis):

| component | weight percent |
|---|---|
| (1) phthalic anhydride | 96–99 |
| (2) trimellitic acid and/or acid anhydride | 0.2–0.3 |
| (3) benzoic acid and/or acid anhydride | 0.1–0.2 |
| (4) other components | balance to 100% |

Similarly, and for example, a typical phthalic anhydride light ends composition is now believed to be as follows (on a 100 weight percent total composition basis):

| component | weight percent |
|---|---|
| (1) phthalic anhydride | 45–90 |
| (2) benzoic acid or benzoic acid anhydride | 7–42 |
| (3) maleic acid or maleic acid anhydride | 3–13 |
| (4) other components | less than 1.0% |

Similarly, and for example, presently preferred and more preferred bottoms compositions which are suitable for use as starting materials in the practice of the present invention are shown in Table I below (based on presently available information concerning phthalic anhydride bottoms compositions):

TABLE I

Phthalic Anhydride Bottoms

| Component or Property | Preferred | More Preferred |
|---|---|---|
| I. Component (100 wt % basis) | | |
| (1) phthalic anhydride | 50–95 | 60–90 |
| (2) trimellitic acid and/or trimellitic acid anhydride | 1–20 | 1–13 |
| (3) anthraquinone | — | 0.5–4 |
| (4) isophthalic acid and/or isophthalic acid anhydride | — | 0.3–2 |
| (5) unknown acetone insolubles[1] | 3–35 | 8–30 |

Table I footnote:
[1]The term "percent acetone insolubles" as used herein refers to the percentage by weight of a sample that is sufficiently insoluble in acetone to allow such to be removed by suction filtration. Weight percent is calculated as the difference between the sample weight and the weight of the residual material after evaporation of the acetone from the filtrate. (This represents the soluble material and any difference from the starting sample weight is the weight of the insoluble material.)

Thus, characteristically, phthalic anhydride light ends contain mainly phthalic anhydride plus benzoic acid or benzoic acid anhydride, plus maleic acid anhydride (or maleic acid); characteristically phthalic anhydride bottoms contain mainly phthalic anhydride, trimellitic acid and/or trimellitic acid anhydride, plus unknown acetone insolubles; and, characteristically, phthalic anhydride crude contains phthalic anhydride (and/or phthalic acid), trimellitic acid (and/or trimellitic acid anhydride), and benzoic acid (and/or benzoic acid anhydride).

In actual commercial practice, it is believed that, in a bottoms composition, the quantity of phthalic anhydride present can range from a low of about 10 weight percent to a high of about 96 weight percent on a 100 weight percent total bottoms basis, with the balance up to 100 weight percent thereof in any given bottoms compositions being mainly trimellitic acid and/or trimellitic acid anhydride plus unknown acetone insolubles. Similarly, in actual commercial practice, it is believed that, in a light ends composition, the quantity of phthalic anhydride present can range from a low of about 45 weight percent up to a high of about 90 weight percent on a 100 weight percent total light ends basis with the balance up to 100 weight percent thereof in any given light ends composition being mainly benzoic acid (or benzoic acid anhydride) and maleic acid (or maleic acid anhydride).

In accord with the present invention, a starting phthalic anhydride bottoms composition preferably has the following characteristics:

TABLE II

| Characteristic | Broad Range | Preferred Range |
|---|---|---|
| hydroxyl number | about 0 | about 0 |
| acid number | 100–725 | 450–600 |

In accord with the present invention, a starting phthalic anhydride light ends composition preferably has the following characteristics:

TABLE III

| Characteristic | Broad Range | Preferred Range |
|---|---|---|
| hydroxyl number | about 0 | about 0 |
| acid number | 100–725 | 450–600 |

In accord with the present invention, a starting phthalic anhydride crude composition preferably has the following characteristics:

TABLE IV

| Characteristic | Broad Range | Preferred Range |
|---|---|---|
| hydroxyl number | about 0 | about 0 |
| acid number | 650–750 | 700–750 |

For purposes of practicing the present invention, particularly on a commercial scale, as those skilled in the art will readily appreciate from the preceding description it may be desirable, and indeed it is presently preferred, to standardize bottoms (or light ends, or crude, all as the case may be) compositions so that successive runs in making a given product polyol blend composition of the present invention will tend to produce nearly identical systems (when identical process conditions are employed). Crude, bottoms and/or light ends can, if desired, each be regulated generally as to composition either by controlling the process conditions (for example, the second distillating step) used for phthalic anhydride production (from a constant feedstock).

It may also be desirable, and indeed it may sometimes be preferred, to simply carry out post-process addition to a crude, bottoms or light ends composition of substantially pure phthalic anhydride (or acid), or trimellitic anhydride (or acid), as the case may be so as to produce a desired starting mixture composition for reaction with formula (1) polyol to make a polyol blend composition of this invention. Simple mixing procedures may be employed.

Sometimes it may be desirable to add trimellitic anhydride (or acid) or phthalic anhydride (or acid) to a batch already comprised of a mixture of polyol formula (1) and a process stream from phthalic anhydride manufacture. The relative percentage of unknown acetone insolubles can be reduced by addition of such phthalate or benzoate species. Because of starting material cost considerations, it presently appears that it is more economical to control such a starting composition by process condition-controlling rather than by post-process blending operations wherever practical. However prepared, a starting mixture blend of aromatic di-and tricarboxylic acids for use in this invention should have a composition as above characterized.

Esterification of Starting Acidic Composition

A starting preformed acidic mixture composition, such as indicated above, which is to be esterified in accord with this invention typically has an acid number of from about 380 to 750 and preferably from about 500 to 700. The hydroxyl number of such a composition is typically substantially zero.

The term "hydroxyl number" as used herein is defined as the number of milligrams of potassium hydroxide required for the complete neutralization of the hydrolysis product of a fully acetylated derivative prepared from one gram of a polyol or a mixture of polyols. The term "hydroxyl number" is also defined by the equation:

$$OHV = \frac{56.1 \times 1000 \times F}{M.W.} \quad (3)$$

wherein:
OHV is the hydroxyl number (of the polyol or polyol blend),
F is the average functionality (i.e., the average number of active hydroxyl groups per molecule of the polyol or polyol blend), and
M.W. is the average molecular weight of the polyol or polyol blend.

The term "acid number" as used herein is defined as the number of milligrams of potassium hydroxide required to neutralize the acid material present in one gram of sample.

The phthalic anhydride weight percentage in a starting mixture composition is conveniently based upon the total compositional weight of a starting composition used in the esterification procedure.

Such a starting acidic mixture composition is admixed with at least one formula (1) polyol to produce an initial mole ratio of formula (1) polyol(s) to such an aromatic acid or acid anhydride composition in the range from about 1.9 to 4 (and preferably from about 2 to 3). This mole ratio can be based on an estimate of the total content of carboxylic acid and carboxylic acid anhydride species in a given starting composition of the aromatic carboxylic acid and/or acid anhydrides.

Since a given starting acidic starting composition may be a solid at ambient temperatures, the mixing of formula (1) polyol with starting acidic composition is preferably carried out with such starting acidic composition in a liquid (heated) state. Particularly to avoid wasting energy, a presently preferred mixing temperature is in the range from about 150 to 250° C., although somewhat higher or lower such mixing temperatures can be used as desired.

In plant operating conditions, and for energy conservation reasons, a preferred operating procedure in accord with the present invention involves transferring a given starting acidic composition in a heated condition from the production zone to either an intermediate heated holding tank (or zone) or directly to an esterification reactor (or reaction zone) wherein mixing with aliphatic polyol and mixture heating can be carried out to practice an esterification in accord with the process teachings of this invention.

Instead of using a starting acidic composition derived at least in part from phthalic anhydride manufacture as described above for esterification with formula (1) polyol to produce a polyol blend composition of this invention, one can employ mixtures of substantially pure or purified phthalic anhydride (and/or acid) with substantially pure or purified trimellitic anhydride (and/or acid) and, optionally substantially pure or purified benzoic anhydride (and/or acid) which, when esterified with formula (1) polyols by the esterification conditions above described, produce desirable polyol blend compositions of the invention.

Such a procedure, depending upon the purity of the starting materials, can produce product polyol blends wherein the quantity of acetone insolubles is reducable to zero.

By the teachings of the present invention, acetone insolubles present in a product polyol blend composition should preferably be present only within the weight percentage ranges herein indicated and should preferably be derived only from impurities present either in the starting formula (1) polyol or in the starting aromatic acid composition being esterified to produce a product polyol blend composition. Acetone insolubles preferably should not be added to or blended with a starting material or a product polyol blend composition without first evaluating the effect of such upon product foam properties.

A given mixture of starting acidic composition and formula (1) polyol, for esterification to occur, is heated with mixing at a temperature ranging from about 150° to 250° C. (preferably from about 210° to 240° C.) under liquid phase conditions. This heating or contacting between formula (1) polyol and starting acidic composition is continued until a desired extent of esterification (reaction) has been achieved. Typically, but preferably, such heating is continued until the resulting product mixture reaches an hydroxyl number ranging from about 190 to 600 and an acid number ranging from about 0.01 to 7, and more preferably until such reaches an hydroxyl number ranging from about 270 to 450 and an acid number ranging from about 2 to 7. A desired hydroxyl value may be achieved by adding to, or removing from, a reaction mixture formula (1) polyol. Typical contacting (esterification) times range from about 3 to 12 hours. Higher contacting temperatures usually produce lower contacting times. During the contacting, the reactants are preferably agitated and admixed together. Preferably, approximately equal stoichiometric respective amounts of phthalic anhydride and polyol are employed.

An esterification reaction used for producing an ester polyol blend product of this invention from a starting acidic composition may, if desired, be carried out in the presence or absence of a catalyst, as those skilled in the art will appreciate. Suitable catalysts include organotin compounds, particularly tin compounds of carboxylic acids, such as stannous octoate, stannous oleate, stannous acetate, stannous laurate, dibutyl tin dilaurate, other such tin salts, and the like. Additional suitable catalysts include metal catalysts, such as sodium and potassium acetate, tetraisopropyl titanates, and other such titanate salts, and the like.

Table V (below) summarizes contacting (esterification) conditions:

TABLE V

| Approximate Contacting (Esterification) Conditions | | | |
|---|---|---|---|
| Component or Property | Broad | Preferred | More Preferred |
| (1) initial mole ratio (polyol to acidic composition) | 1.9–4 | 2:1–3.5:1 | 2:1–2.5:1 |
| (2) temperature | 150–270° C. | 165–250° C. | 210–240° C. |
| (3) liquid phase | yes | yes | yes |
| (4) typical contacting times | 1.5–12 | 3–12 hours | 4–8 hours |

Polyol Blend Composition

Typically, after an esterification procedure as described above is completed, a resulting product blend is produced which contains unreacted residual unreacted formula (1) product in an amount ranging from 2 to about 25 weight percent, based on total product weight, though a given product can contain larger quantities of such formula (1) polyol excess. If a quantity of excess formula (1) polyol below about 5 to 10 weight percent is desired in a given product polyol blend, then one may use nitrogen sparging during the esterification to remove unreacted formula (1) polyol.

A product polyol blend compositon of this invention is typically found to be a complex mixture of aromatic ester polyols of undetermined exact composition, but a component typically present in any given such composition is believed to be at least one diester of phthalic acid with formula (1) polyol as shown in the following generic formula:

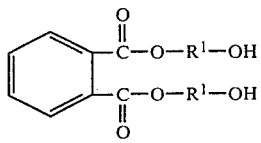 (2)

where $R^1$ is as above defined.

The exact amount of formula (2) material which can be present is presently unknown generally; however, in the case of using a formula (1) polyol such as diethylene glycol, it appears that a product polyol blend may contain at least about 18 weight percent of a bisdiester of the formula (2) type. Typically, a product aromatic ester polyol blend composition is, at room or ambient temperature and pressure, in the physical form of a colored liquid, though gel-like material can sometimes be produced. A polyol blend composition of this invention appears to be indefinitely shelf stable.

In general, in practicing this invention, the process conditions and the starting materials are each so selected so as to produce a product aromatic ester polyol aromatic blend composition which is characterized by having an hydroxyl number in the range from about 190 to 600 and an acid number ranging from about 0.01 to 7. A polyol blend composition of this invention thus comprises:

(a) a content of aromatic esters from the reaction of phthalic anhydride (or acid) and starting formula (1) polyol ranging from about 50 to 95 weight percent (100 weight percent total product blend composition basis), (b) a content of aromatic esters from the reaction of formula (1) polyol with trimellitic acid (or anhydride) ranging from about 5 to 35 weight percent (100 weight percent total product composition basis), and (c) a content of aliphatic formula (1) polyol ranging from about 2 to 25 weight percent (100 weight percent total product composition basis).

Such a polyol blend composition has a content of acetone insolubles which is preferably below about 15 weight percent (100 weight percent total product composition basis).

Table VI (below) summarizes some product ester polyol composition characteristics:

TABLE VI

| Ester Polyol Product Characteristics Approximate Weight Percent[1] or Property Value | | |
|---|---|---|
| Component or Property | Broad | More Preferred |
| I. Component (100 wt % basis) | | |
| (1) content of (formula (1) polyol[2] | 2–25 | 3–15 |
| (2) content of unknown acetone insolubles[3] | 0–15 | 0–10 |
| (3) total content of phthalate and trimellitate | 62–98 | 85–97 |
| (4) content of phthalate esters | 50–95 | 55–93 |
| (5) content of trimellitate esters | 5–35 | 8.5–33 |
| (6) content of benzoate ester(s) | 0–12 | 0–2 |
| II. Property | | |
| (4) hydroxyl number[4] | 190–600 | 270–480 |
| (5) acid number[5] | 0.01–7 | 2–6 |
| (6) saponification value[6] | 295–425 | 350–400 |
| (5) viscosity[7] | 1,000–150,000 cps | 2,000–25,000 cps |

Table VI footnotes:
[1]The complete composition of an ester polyol product of this invention is not presently known on a 100 weight percent total basis. The component contents shown in this Table are therefore not intended to, and probably do not in fact account for, the total composition of a given such product.
[2]Gas chromatography is utilizable in determining the free (unreacted) aliphatic polyol content of a product of this invention. For example, a silica based column (e.g., a UCW 98 6' × ⅛" column) is employable using isothermal conditions of 150° C. to achieve a separation. An external standard of a particular glycol, such as the preferred diethylene glycol, is preferably used as a basis for quantitation.
[3]Weight percent of unknown acetone insolubles as measured as described in footnote 1 of Table I (above)
[4]Hydroxyl number is measured as described above in the section entitled Esterification of Starting Acidic Composition.
[5]Acid number is measured as described above in the section entitled Esterification of Starting Acidic Composition.
[6]The term "saponification value" is identified by the number of milligrams of potassium hydroxide required to react with the ester groups present in one gram of sample. To determine saponification value, the American Chemist's Society Official Method No. c-d-3-25 is employed.
[7]Viscosity is measured at 25° C. by using a Brookfield viscometer (model RVF) with a #6 spindle operating at 10 rpm.

Particularly because of what can be the unknown compositional characteristics of a starting acidic mixture composition, and also because of the possibility that compositional variations can occur from one batch of such a composition to another, generalizations about product aromatic ester polyol blend compositions of this invention are difficult to make. The following observations are offered in good faith based on presently available information and observations and there is no intent herein to be bound thereby:

(1) Viscosity appears to increase as the quantity of formula (1) aliphatic polyol decreases (owing to reaction with carboxylic moieties or to removal by distillation, or the like).
(2) Hydroxyl number appears to decrease as the quantity of formula (1) polyol decreases.
(3) Saponification values appear to be roughly correlatable with the content of unknown acetone insolubles.

Resin Blends

A product ester polyol composition of this invention is blendable with other polyols preferably those of formula (1) such as those polyols used in the prior art as reactants with isocyanates to produce liquid precursor or prepolymer resin blends employable for reaction with isocyanates to produce polyurethane and/or polyisocyanurate foams. In general, resin prepolymer blend compositions of this invention are prepared by simple mechanical mixing procedures well known to those familiar with the art.

Aliphatic fluorocarbons of the type used in the art as blowing agents in making such foams characteristically tend to be only slightly soluble in a product polyol blend compositions of this invention. To overcome this problem, and to compound a product ester polyol composition with such an aliphatic fluorocarbon, a solubilizing agent or surfactant system is preferably added to a polyol blend in order to produce a resin precurser blend which is homogeneous.

Surprisingly, in polyol blend compositions of this invention, formula (1) polyols appear to be beneficial as solubilizing or compatibilizing agents for aliphatic fluorocarbon compounds of the type which characteristically vaporize above about 20° C. This action or effect is such that in a liquid polyol blend composition at least about 10 parts by weight of such fluorocarbon are soluble in 100 parts by weight of said liquid polyol. Such fluorocarbon compounds, as those skilled in the art appreciate, are of the type which are conventionally used as blowing agents employed in the process making cellular polyurethane and polyisocyanurate foams.

As shown above (see Table VI), unexpectedly, it appears to be advantageous for a product ester polyol blend compositon of this invention to contain unreacted (excess) formula (1) compound(s). The quantity of the excess present in any given instance appears to be dependent upon the effects or results desired (as in a resin blend composition prepared from a product polyol blend composition of this invention) so that the exact amount in any given instance is thus a choice of the user. Thus, the presence of such an excess appears to have various beneficial effects. For one thing, the compounding of a product ester polyol blend composition into a resin precursor blend composition containing a fluorocarbon blowing agent, such as can be accomplished when formulating a product ester polyol composition of this invention into a resin precursor blend composition to be used for subsequent reaction with a isocyanate in the presence of a catalyst to produce a product foam, appears to be beneficial because such formula (1) polyol excess exerts a compatibilizing effect between fluorocarbon blowing agent and polyol blend compositon. The fluorocarbon blowing agent appears to be soluble or compatible only to a limited extent without the presence such formula (1) compound. For another thing, the reactivity of (a) such a formulated resin precursor blend of product ester polyol blend with excess polyol of formula (1) and a conventional organoisocyanate, in the presence of a catalyst, especially a conventional trimerization catalyst of the type used to make polyisocyanurate foams, appears to be accelerated by the presence of such an excess. This is demonstrated, for example, by a characteristically shorter initial cream time and a shorter tack free time in a foaming and freshly foamed cellular product, as compared to, for example, corresponding respective such times associated with a corresponding reaction of a formulated resin blend of product ester polyol composition that contains very little, or even substantially no, excess formula (1) polyol. For still another thing, the cellular product formed from the reaction of such a formulated resin prepolymer blend containing excess formula (1) polyol and conventional isocyanate (in the presence of catalyst, especially a conventional trimerization catalyst) appears to have a better blush and a reduced friability, compared to, for example, a corresponding cellular product produced with formulated resin blend of product ester polyol composition that contains very little, or even substantially no, excess formula (1) polyol. For still another thing, the ambient temperature fluidity of a product ester polyol composition seems to be improved, and the liquid viscosity thereof lowered, by the presence of excess formula (1) polyol in combinaton therewith which permits ready and convenient blending of such a composite composition with other ingredients to produce a resin blend. The reasons for these various beneficial effects are not definitely known or understood at this time.

The quantity of such an excess of formula (1) polyol used in, or contained in, a product ester polyol blend composition which produces such a beneficial effects as above indicated presently appears to be preferably in the range from about 2 to about 25 weight percent based on 100 weight percent combined or composite composition of a product ester polyol condensate composition and excess of at least one formula (1) polyol, though larger and smaller amounts of such a formula (1) polyol excess can be employed, if desired. The quanity of excess unreacted polyol formula (1) present in a product ester polyol composition of this invention can be estimated by any convenient procedure. One presently preferred procedure is to employ gas chromatography. The difference between the amount of unreacted polyol [e.g., of formula (1)] and the balance up to 100 weight percent of any given ester polyol blend composition of this invention can be used conveniently as an estimate for the actual amount of unreacted product formula (1) polyol present.

As used herein, the term "initial cream time" has reference to the time required for foaming to commence in a fully mixed system of resin blend and isocyanate (including catalyst) using starting materials at 25° C.

Similarly, the term "tack free time" has reference to time required from initial mixing for a foam to achieve a condition such that an exposed surface thereof is tack free when contacted lightly by a human finger or the like.

Similarly, the term "blush" has reference to the visual or optical appearance of the surface of a foam after total foam rise and achievement of tack free time.

Similarly, the term "friability" has reference to the condition of the surface of a foam which has achieved a total foam rise and a tack free condition, as determined by moving a human finger or the like over such surface and visually observing whether crumbling or crushing of such surface is observed, and, if so, the approximate extent thereof.

The combination of such an excess of formula (1) polyol with product ester polyol composition appears to cause an elevation of the hydroxyl number associated with such a composite composition, and such increase in hydroxyl number is generally directly proportional to the quantity of such excess present. The type of formula (1) polyol and the quantity of the excess thereof present may influence the final value of the hydroxyl number existing in any given composite resin product ester polyol composition. Owing to the possible compositional variations in product composite ester polyol composition, it is not presently possible to provide information about exact quantities of product ester polyol composition and of formula (1) polyol which will produce a given hydroxyl number.

Multifunctional (polyhydroxylated) polyols of formula (1) appear to elevate the hydroxyl number of a product ester polyol composition at a faster rate per quantity there present than is associated with dihydroxylated polyols of formula (1). Presently available information suggests that the hydroxyl number of a product composite resin prepolymer composition is preferably kept below about 380, especially when the manufacture of polyisocyanurate foams is contemplated therefrom, but composite compositions having higher hydroxyl numbers can be prepared and utilized to make resin blends, if desired, as those skilled in the art will appreciate.

At the present time, no means is known for quantitatively correlating the hydroxyl number of a composite polyol blend or resin prepolymer composition with one or more of the beneficial effects above described; the number of variables involved apparently makes such a generalization exceedingly difficult, if not impossible, to achieve.

For a given formulated resin prepolymer blend containing a product ester polyol composition with excess formula (1) polyol (particularly diethylene glycol), available data indicates that when the hydroxyl number is within a preferred range of 270 to 480, the resin prepolymer blend will produce a desirable or useful combinaton of beneficial effects, such as those described above. By simple conventional experimentation, those skilled in the art can and will routinely correlate for a particular system the hydroxyl number of a composite resin prepolymer blend composition with such beneficial effects.

Typically, a product resin prepolymer blend is in the form of a homogeneous liquid at room temperature conditions. At the time of use (e.g., reaction with isocyanate), this resin prepolymer blend initially preferably has a viscosity in the range from about 100 to 50,000 centipoises (measured with a Brookfield viscometer with a #2 spindle at 25° C.). The particular composition of a given product resin prepolymer blend depends upon the end use of the polyurethane or polyisocyanurate product to be made. A product foam can be a flexible or a rigid material which is influenced by the hydroxyl number of the polyol blend employed.

In producing, for example, cellular rigid polyurethanepolyisocyanurates, a resin prepolymer blend preferably possesses an hydroxyl number ranging from about 150 to about 1000. In producing semi-flexible such material, the hydroxyl number for such a blend is usually in the range from about 100 to 250. Lower hydroxyl numbers ranging from about 32 to 150 are usually appropriate for resin prepolymer blends being employed to produce flexible polyurethanes; acid numbers typically fall in the range from about 0.1 to 5. These respective ranges of hydroxyl numbers and acid numbers are not intended to be restrictive, but are merely presented as illustrative of the relatively large number of polyol blend and resin prepolymer blends, and combinations thereof that can be employed in foam manufacture utilizing the teachings of present invention.

Liquid, homogeneous (compatible) resin prepolymer blend compositions of the present invention which can be reacted with isocyanates to produce cellular polyurethanes and polyisocyanurates are characterized in the following Table VII:

TABLE VII

| Component | Weight percent (100 wt % total composition basis) | |
|---|---|---|
| | Broad | Preferred |
| (1) polyol blend composition[1] | 5–80 | 25–70 |
| (2) fluorocarbon blowing agent (low molecular weight fluorinated alkane) | 18–40 | 20–30 |
| (3) catalyst (polyurethane and/or polyisocyanurate forming) | 0.5–8 | 0.5–6.0 |
| (4) water | 0–4 | 0.1–3.0 |
| (5) silicone cell stabilizing surfactant[2] | 0.2–4 | 0.5–3.0 |
| (6) added formula (1) polyol[3] | 5–35 | 2–25 |

Table VII footnotes:
[1]A polyester polyol blend composition of this invention as herein defined.
[2]A presently preferred such surfactant is dimethyl-polysiloxane polyalkylene oxide copolymer.
[3]The amount of formula (1) polyol added beyond the quantity of formula (1) compound present in a starting polyol blend of this invention. The minimum amount so added within the range indicated is preferably at least a quantity which is sufficient either (a) to compatibilize (solubilize) the fluorocarbon blowing agent with other components present in a product resin precursor blend, or (b) to raise the level of the hydroxyl number to a desired value in the range from about 100 to 300 whichever such minimal quantity is higher. The quantity of formula (1) polyol present in a starting polyol blend composition, as those skilled in the art will appreciate, can be determined as a difference value from gas chromatographic analysis of the unreacted polyol content of a polyol blend or resin precursor composition of this invention.

The individual components shown in Table VII are preferably so selected in the case of any given composition that the produced resin prepolymer blend is characterized by:
 (1) being homogeneous;
 (2) being shelf life stable for a period of time of at least seven days at ambient temperatures and pressures;
 (3) having an hydroxyl number ranging from about 100 to 300;
 (4) having a viscosity in centipoises of from about 100 to 5000 measured with a Brookfield viscometer at 25° C. operating at 10 rpm with a #10 spindle.

In addition to the components shown in Table VII, a resin prepolymer blend composition can optionally contain the following additonal components as shown in Table VIII:

TABLE VIII

| Optional Component | Weight percent (100 wt % total composition basis) | |
|---|---|---|
| | Broad | Preferred |
| (1) flame retardant | 0–25 | 0–12 |
| (2) alkoxylated alkyl phenol[2] (nonionic sufactant) | 0–30 | 10–20 |
| (3) ethoxylated cocoamide[1] | 0–20 | 1.5–12 |
| (4) filler | 0–25 | 0–15 |

TABLE VIII-continued

| Optional Component | Weight percent (100 wt % total composition basis) | |
|---|---|---|
| | Broad | Preferred |
| (5) chain extenders | 0–10 | 0–5 |
| (6) hydroxyl group containing material | 0–85 | 40–60 |
| (7) polyols having a molecular weight of from about 200 to 1000 | 0–65 | 20–50 |

Table VIII footnotes:
[1]Such nonionic surfactant typically has an hydroxyl value of from about 250 to 350 and is substantially completely soluble in a polyol blend. It has characteristically two hydroxyl groups per molecule.
[2]Such nonionic surfactant typically has an hydroxyl value of from about 85 to 100 and is substantially completely soluble in a polyol blend. It has characteristically one hydroxyl group per molecule.

Catalyst

Particularly, when a resin precursor or prepolymer blend is to be sold or used as a complete preformulation or system which needs only to be mixed with an isocyanate system before foaming takes place, it is conventional to admix with a resin precursor or resin blend:
(a) a catalyst or catalyst system, and
(b) a blowing agent.

These components must be compatible with one another and with the polyol blend. Both (a) and (b) are conventionally chosen from among the known materials so as to produce compatibility with the particular polyol blend involved in any given instance.

The urethane-forming reaction is usually carried out in the presence of a minor amount of a urethane-isocyanate forming catalyst. Such a catalyst preferably comprises an amine. Suitable amine catalysts include one or more of the following: N,N'-dimethyl cyclohexylamine; methyl dicyclohexylamine; N-methylmorpholine; N-ethylmorpholine; N-octyadecylmorpholine; triethylamine; tributylamine; trioctylamine; N,N,N'N'-tetramethylenediamine; N,N,N'N'-tetramethyl-1,3-butane-diamine; triethanolamine; N,N-dimethylethanolamine; triisopropanolamine; N-methyldiethanolamine; bis(2-di-methylaminoethyl)ether; hexadecyldimethylamine; N,N-dimethylbenzylamine; trimethylamine; triethylenediamine (i.e., 1,4-diazabicyclo-[2.2.2-octane)); the formate and other salts of triethylenediamine; oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol").

The amine catalyst is present in the final urethane-producing reaction mixture in an amount ranging from about 0.05 to about 3 parts by weight of catalyst (that is, the amine exclusive of other components present in solutions thereof) per 100 parts by weight of polyol reactant.

In producing polyurethanes from polyester polyols of this invention, it may be desirable to include as a further component of the reaction mixture a minor amount of certain metal catalysts. Such supplementary catalysts are well known to the urethane art. For example, useful metal catalysts include organotin compounds, particularly tin compounds of carboxylic acids, such as stannous octoate, stannous oleate, stannous acetate, stannous laurate, dibutylin dilaurate, and other such tin salts. Additional metal catalysts are organo-compounds of other polyvalent metals such as zinc and nickel (e.g., nickel acetylacetonate), or other such metal catalyst which are well known in the art of flexible polyether urethane foam manufacture. The amount of each such metal catalysts which can be present in the polyurethane-producing reaction mixture is from about 0.05 to about 2 parts by weight per 100 parts by weight of the polyether polyol starting material.

The polyisocyanurate-forming reaction is usually carried out with a trimerization catalyst. Any such catalyst known to those skilled in the art which will catalyze the trimerization of an organic isocyanate compound to form the isocyanurate moiety can be employed in a polyol composition or resin prepolymer blend of this invention. Further, a combination of urethane foaming catalyst and trimerization catalyst can be employed if desired.

In general, a polyol blend of this invention can contain from about 0.5 to 6 weight percent on a 100 weight percent total blend basis of a catalyst or mixture of catalysts with a range of from about 1 to 4 weight percent being presently preferred.

Blowing Agent

When it is desired to provide cellular polyurethanes, the reaction mixture also includes a minor amount of a foaming or blowing agent, such as water or fluorocarbon, which generates a gas either by reaction with isocyanate to generate carbon dioxide in situ, or by the vaporization of blowing agent by the exotherm of the reaction, or by a combination of the two procedures. These various blowing techniques are known in the art. Thus, in addition to, or in place of water, other blowing agents which can be employed in the practice of this invention include: methylene chloride, liquified gases which have boiling points below 80° F. and above 60° F., or other inert gases, such as nitrogen, carbon dioxide added as such, methane, helium, and argon. Suitable initially liquified gases include aliphatic and cycloaliphatic fluorocarbons which vaporize at or below the temperature of the foaming mass. Such gases are at least partially fluorinated and may also be otherwise halogenated. Illustrative of the preferred fluorocarbon blowing agents are trichloromonofluoromethane; dichlorodifluoromethane; 1,1-dichloro-1-fluoroethane; 1,1,1-trifluoro-2-fluoro-3,3-difluoro-4,4,4-trifluorobutane; hexafluorocyclobutane; and octafluorocyclobutane. When producing flexible foams, the generally preferred method of foaming is the use of water of a combination of water plus a fluorocarbon blowing agent such as trichloromonofluoromethane. On the other hand, in producing rigid foams the blowing agent is usually one of the aforesaid halogenated compounds.

The amount of blowing agent employed in the foaming reaction will vary with factors, such as the density that is desired in the foamed product. Usually, however, from about 1 to about 30 parts by weight of the blowing agent per 100 parts by weight of polyol is employed.

When water is the blowing agent, it is present at the time of polyol reaction with isocyanate in the proportion of from about 1 percent to 6 percent, preferably from about 2 to 5 percent by weight.

The fluorocarbon blowing agent can be any of the fluorocarbons known to those skilled in the art and which can be used for blowing polymer mixtures into cellular polymers. Generally speaking, such blowing agents are halogenated aliphatic hydrocarbons which are also substituted by chlorine and/or bromine in addition to the fluorine content and are well known to those skilled in the art; see U.S. Pat. No. 3,745,133, column 11, lines 25 to 38 which disclosure relating to fluorocarbon blowing agents is incorporated by reference herein.

Isocyanates

The polyisocyanates used as starting material in the manufacture of polyurethanes and polyisocyanurates are known to the art and any of such reactants are suitably employed in producing foam compositions of this invention. Among the suitable polyisocyanates are those represented by the general formula:

$$Q(NCO)_i$$

wherein i has an average value of at least two, and Q is an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkylene or aralkylene radical including corresponding halogen-substituted radicals. Typical examples of suitable polyisocyanates for use in preparing the flame retarded polyurethane of this invention are: 1,6,-hexamethylene diisocyanate; 1,4-tetramethylene diisocyanate; 1-methyl-2,4-diisocyanatocyclohexane; bis(4-isocyanatophenyl)methane; phenylene diisocyanates such as 4-methoxy-1,3-phenylenediiso-cyanate; 4-chloro-1,3-phenylenediisocyanate; 4-bromo-1,3-phenlnediisocyanate; 5,6-dimethyl-1,3-phenylenediisocyanate; 2,4- and 2,6-tolyenediisocyanates; crude tolyenediisocyanate; 6-isopropyl-1,3-phenylenediisocyanate; durylene diisocyanate;
and triphenylmethane-4,4',4''-triisocyanate. Other suitable polyisocyante reactants are ethylphosphonic diisocyanate and phenylphosphonic diisocyanate. Also useful are the polyisocyanates of the aniline-formaldehyde polyaromatic type which are produced by phosgenation of the polyamine obtained by acid catalyzed condensation of aniline with formaldehyde. Polyphenylmethylene polyisocyanates of this type are available commercially under such trade names as PAPI, AFPI, Mondur MR, Isonate 390P, NCO-120, NCO-10, and NCO-20. These products are low visocity (50-500 centipoises at 25° C.) liquids having average isocyanate functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinatons are: a mixture of 2,4-tolylene diisocyanate; 2,6-tolylene diisocyanate and the aforesaid polyphenyl-methylene polyisocyanates; and a mixture of isomeric tolylene diisocyantes with polymeric tolylene diisocyanates obtained as residues from the manufacture of the diisocyanates.

The amount of polyisocyanate employed varies slightly depending upon the nature of the foam being prepared. In general, the polyisocyanates are employed in amounts that provide from 90 to 500 percent preferably from 100–400 percent of the stoichiometric amount of the isocyanate groups required to react with all of the hydroxyl groups present in the reaction mixture, including the hydroxyl groups of the polyol of formula (1) and/or the polyol blend (above described), as the case may be.

Advantageously, and in order to obtain foams having exceptionally high heat resistance and structural strength, a presently preferred type of polyisocyanates comprises the polymethylene polyphenyl polyisocyanates. Also presently preferred are the polymethylene polyphenyl polyisocyanates which have been treated with a minor amount of an epoxy compound to reduce acidic impurities and the polymethylene polyphenyl polyisocyanates which contain high levels of the 2,4-isomer.

A presently preferred organic polyisocyanate is a mixture containing from about 30 percent to about 85 percent by weight of methylene-bis-(phenylisocyanate) and the remainder of said mixture comprises polymethylene polyphenyl polyisocyanates of functionality higher than 2.0.

In carrying out the preparation of polyisocyanurate foams in accordance with the process of the invention, and, in particular, polyisocyanurate foams for the preparation of foam laminates, the procedures and equipment conventional in the art are employed.

Foam Products

In general, product foams of this invention have many uses. For examples, they can be used as rigid urethane and isocyanurate foams in applications such as: construction, tanks and pipes, appliances, transportation, furniture, marine, packaging, and the like.

Presently preferred product foams of this invention are prepared from the reaction of a polyol formulation of Table VII above with a preferred isocyanate system as above specified. Such product foams preferably have the following properties:

TABLE IX

| Property | Preferred | More Preferred |
| --- | --- | --- |
| Density, pcf | 1.5–15.0 | 1.80–5.0 |
| Compressive Stength, psi | 20–80 | 30–50 |
| Dimensional Stability, 158° F. 100% R.H., Volume Change After 7 days, % | 10 | 6 |

If desired, other additional ingredients can be employed in minor amounts of producing the foams in accordance with the process of this invention. Illustrative of such other additives that can be employed are additional flame-retarding agents, cross-linking agents such as glycerol, triethanolamine and their oxyalkylated adducts, as well as fillers, dyes, pigments, anti-yellowing agents, and the like.

EMBODIMENTS

The present invention is further illustrated by reference of the following examples. Those skilled in the art will appreciate that other and further embodiments are obvious and within the spirit and scope of this invention from the teachings of these present examples taken with the accompanying specification.

Example A

A specimen of a phthalic anhydride bottoms composition is obtained having:
(a) a phthalic anhydride content of about 60 weight percent (total composition basis), (b) a trimellitic anhydride content of about 5 weight percent (total composition basis)

(c) a hydroxyl number estimated to be about 0, (d) an acid number estimated to be about 500–700.

To a three-liter, four-neck, round-bottom flask equipped with a stirrer, thermometer, nitrogen inlet tube and a goose-neck condenser there is added at ambient temperature and pressure (a) 700 grams (about 3 moles) of the above phthalic anhydride bottoms in a pulverized form and (b) 40 grams of trimellitic anhydride (about 0.7 moles) followed by 1060 grams (about 10 moles) of diethylene glycol. The mixture is heated to 220° C. and kept at this temperature until the acid number of the reactant mixture is found to be not more than 7.0, and then sufficient diethylene glycol is removed from the reaction zone to achieve the final product hydroxyl and viscosity values. The reaction product is an ester polyol composition which, when cooled to room temperature, is a black liquid that is found to have an hydroxyl number of about 312 and a viscosity of about 25,000 centipoises at 25° C. measured using a Brookfield viscometer (model RVF) with a #6 spindle operating at about 10 rpm. Details for this Example are summarized in Table X below.

Examples B–H

The procedure of Example A is repeated using different conditions to prepare various product ester polyol compositions. The details including weight of charges reactant ratios, and product characteristics are summarized in Table X below. The reaction product in each instance is believed to contain diethylene glycol phthalate.

Each of the products of Examples A–H is reactive with isocyanates to produce polyurethane-polyisocyanurate foam products.

Example I

The phthalic anhydride bottoms composition of Example A is reacted with 1,1,1-trimethylolpropane as follows:

To a five-liter, four-neck round-bottom flask equipped with a stirrer, thermometer, nitrogen inlet tube, and a goose-neck condenser, there is added 1405 grams (about 6 moles) of phthalic anhydride, 75 grams of trimellitic anhydride (about 0.39 moles) and 2680 grams (20 moles) of trimethylolpropane. The mixture is heated to 190° C with stirring and kept at this temperature until the acid number is 5. The reaction product (an ester polyol composition) is then cooled to room temperature and analyzed. The hydroxyl number is found to be 565.2. The black product is a gel-like material at 25° C. which contains compounds with the structural formula:

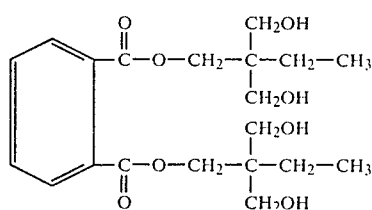

TABLE X
Summary of Examples A–H

| Example Number | Reactants (A) | (B) | Process Conditions (C) | (D) | (E) | Product Characteristics[1] (F) | (G) | (H) |
|---|---|---|---|---|---|---|---|---|
| A | 700 | 40 | 1060 | 220 | 11.0 | 7.0 | 312 | 25,000 |
| B[2] | 480 | 260 | 1060 | 220 | 5.0 | 0.5 | 226 | 61,000 |
| C[2] | 480 | 260 | 1060 | 220 | 4.0 | 5.5 | 215 | 137,000 |
| D | 665 | 75 | 1060 | 195 | 9.5 | 6.0 | 324 | 19,000 |
| E | 660 | 80 | 1060 | 196 | 15.0 | 4.5 | 310 | 16,000 |
| F[3] | 640 | 100 | 1060 | 220 | 4.5 | 1.0 | 300 | 28,000 |
| G[3] | 620 | 120 | 1061 | 239 | 4.0 | 5.0 | 335 | 24,800 |
| H[3] | 600 | 140 | 1074 | 240 | 3.5 | 2.5 | 390 | 14,000 |

TABLE X Footnotes:
(A) Designates Weight of Phthalic Anhydride Bottoms (grams).
(B) Designates Weight of Trimellitic Anhydride (grams).
(C) Designates Weight of Diethylene Glycol (grams).
(D) Designates Reaction Temperature (°C.).
(E) Designates Reaction Time (hrs.)
(F) Designates Acid Number.
(G) Designates Hydroxyl Number.
(H) Designates Viscosity CPS at 25° C.
[1]In each example, the product ester polyol composition is believed to be comprised of components at least 50 weight percent (on a 100 weight percent total composition basis) of which have aromatic nuclei, and at least two terminal hydroxyl groups per molecule, and at least two ester groups per molecule. In each example, the product ester polyol composition is believed to contain from about 2 to 30 weight percent (on a 100 weight percent product basis) of excess unreacted residual diethylene glycol. In general, for a given product, the lower the content of residual diethylene glycol, the lower the hydroxyl number and the higher the viscosity thereof.
[2]100 parts per million based upon total charge of stannous octoate added as an esterification catalyst in these examples.
[3]50 ml of o-xylene used as an azeotroping agent.

Example J

A specimen of a phthalic anhydride light ends composition is obtained having:

(a) a phthalic anhydride content of about 85 weight percent (total composition basis), (b) a hydroxyl number estimated to be about 0, (c) an acid number estimated to be about 700.

To a three-liter, four-neck, round-bottom flask equipped with a stirrer, thermometer, nitrogen inlet tube and a goose-neck condenser there is added at ambient temperature and pressure 700 grams (about 3 moles) of the above phthalic anhydride light ends and 40 grams of trimellitic anhydride (about 0.2 moles) all in a pulverized form followed by 1060 grams (about 10 moles) of diethylene glycol. The mixture is heated to 220° C. and kept at this temperature until the acid number of the reactant mixture is found to be not more than 7.0, and then sufficient diethylene glycol is removed from the reaction zone to achieve the final product hydroxyl and viscosity values. The reaction product is an ester polyol composition which, when cooled to room temperature, is a brown liquid that is found to have an hydroxyl number of about 284 and a viscosity of about 500 centipoises at 25° C. measured using a Brookfield viscometer (model RVF) with a #6 spindle operating at about 10 rpm. Details for this Example are summarized in Table XI below.

TABLE XI
Summary of Examples K–Q

| Example Number | Reactants (A) | (B) | Process Conditions (C) | (D) | (E) | Product Characteristics[1] (F) | (G) | (H) |
|---|---|---|---|---|---|---|---|---|
| K | 480[1] | 260 | 1060 | 220 | 5.0 | 0.5 | 290 | 2,000 |
| L | 660[1] | 80 | 1060 | 220 | 4.0 | 5.00 | 280 | 1,500 |
| M | 680[1] | 60 | 1060 | 195 | 9.5 | 6.00 | 312 | 1,000 |
| N | 640[1] | 100 | 1060 | 195 | 15.0 | 4.00 | 310 | 1,600 |
| O | 620[2] | 120 | 1060 | 220 | 4.5 | 1.00 | 300 | 2,500 |
| P | 600[2][3] | 140 | 1061 | 239 | 4.0 | 4.50 | 325 | 2,100 |

TABLE XI-continued

Summary of Examples K-Q

| Example Number | Reactants | | | Process Conditions | | | Product Characteristics [1] | |
|---|---|---|---|---|---|---|---|---|
| | (A) | (B) | (C) | (D) | (E) | (F) | (G) | (H) |
| Q | 610[2] | 130 | 1074 | 240 | 3.5 | 2.50 | 330 | 1,800 |

TABLE XI Footnotes:
In the heading:
(A) Designates: Weight of Phthalic Anhydride Light Ends (grams).
(B) Designates: Weight of Trimellitic Anhydride (grams).
(C) Designates: Weight of Diethylene Glycol (grams).
(D) Designates: Reaction Temperature (°C.).
(E) Designates: Reaction Time (hrs.).
(F) Designates: Approximated Acid Number.
(G) Designates: Approximated Hydroxyl Number.
(H) Designates: Approximated Viscosity CPS at 25° C.
[1] Nitrogen sparge used to help remove water.
[2] 50 ml of o-xylene used as an azetroping agent.
[3] 100 ppm stannous octoate added as a catalyst.

Examples K-Q

The procedure of Example J is repeated using different conditions to prepare various product ester polyol compositions. The details including weight of charges reactant ratios, and product characteristics are summarized in Table XI above. The reaction product in each instance is believed to contain diethylene glycol phthalate.

Each of the products of Examples J-Q is reactive with isocyanates to produce polyurethane - polyisocyanurate foam products.

Example R

The phthalic anhydride light ends of Example J is reacted with 1,1,1-trimethylolpropane as follows:

To a five-liter, four-neck round-bottom flask equipped with a stirrer, thermometer, nitrogen inlet tube, and a goose-neck condenser, there is added 1400 grams (about 6 moles) of phthalic anhydride, 80 grams of trimellitic anhydride (about 0.4 moles) and 2680 grams (20 moles) of trimethylolpropane. The mixture is heated to 190° C. with stirring and kept at this temperature until the acid number is 5. The reaction product (an ester polyol composition) is then cooled to room temperature and analyzed. The hydroxyl number is found to be 550. The brown product is a gel-like material at 25° C. which contains compounds with the structural formula:

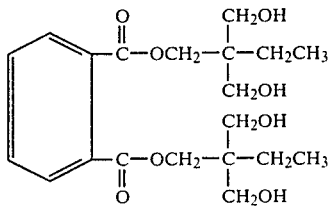

Example S

A specimen of a phthalic anhydride crude composition is obtained having:
(a) a phthalic anhydride content of about 98.5 weight percent (total composition basis),
(b) a hydroxyl number estimated to be about 0,
(c) an acid number estimated to be about 745.

To a three-liter, four-neck, round-bottom flask equipped with a stirrer, thermometer, nitrogen inlet tube and a goose-neck condenser there is added at ambient temperature and pressure 700 grams (about 3 moles) of the above phthalic anhydride crude and 40 grams of trimellitic anhydride (about 0.2 moles) in a pulverized form followed by 1060 grams (about 10 moles) of diethylene glycol. The mixture is heated to 220° C. and kept at this temperature until the acid number of the reactant mixture is found to be not more than 7.0, and then sufficient diethylene glycol is removed from the reaction zone to achieve the final product hydroxyl and viscosity values. The reaction product is an ester polyol composition which, when cooled to room temperature, is a brown liquid that is found to have an hydroxyl number of about 312 and a viscosity of about 2,500 centipoises at 25° C. measured using a Brookfield viscometer (model RVF) with a #6 spindle operating at about 10 rpm.

Examples T-Z

The procedure of Example S is repeated using different conditions to prepare various product ester polyol compositions. The details including weight of charges reactant ratios, and product characteristics are summarized in Table XII below. The reaction product in each instance is believed to contain diethylene glycol phthalate.

TABLE XII

Summary of Examples I-Z

| Example Number | Reactants | | | Process Conditions | | | Product Characteristics [1] | |
|---|---|---|---|---|---|---|---|---|
| | (A) | (B) | (C) | (D) | (E) | (F) | (G) | (H) |
| T | 600[1] | 140 | 1060 | 220 | 5.0 | 0.50 | 285 | 5,500 |
| U | 500[1] | 240 | 1060 | 220 | 4.0 | 5.00 | 295 | 5,000 |
| V | 650[1] | 90 | 1060 | 195 | 9.5 | 6.00 | 325 | 2,800 |
| W | 620[1] | 120 | 1060 | 195 | 15.0 | 4.50 | 310 | 3,000 |
| X | 670[2] | 70 | 1060 | 220 | 4.5 | 1.50 | 300 | 3,200 |
| Y | 550[2][3] | 190 | 1061 | 239 | 4.0 | 4.50 | 330 | 3,500 |
| Z | 610[2] | 130 | 1074 | 240 | 3.5 | 2.50 | 350 | 2,900 |

TABLE XII Footnotes:
In the heading:
(A) Designates: Weight of Phthalic Anhydride Crude (grams).
(B) Designates: Weight of Trimellitic Anhydride (grams).
(C) Designates: Weight of Diethylene Glycol (grams).
(D) Designates: Reaction Temperature (°C.).
(E) Designates: Reaction Time (hrs.).
(F) Designates: Approximated Acid Number.
(G) Designates: Approximated Hydroxyl Number.
(H) Designates: Approximated Viscosity CPS at 25° C.

Each of the products of Examples S-Z is reactive with isocyanates to produce polyurethane - polyisocyanurate foam products.

Example AA

The phthalic anhydride crude of Example S is reacted with 1,1,1-trimethylolpropane as follows:

To a five-liter, four-neck round-bottom flask equipped with a stirrer, thermometer, nitrogen inlet tube, and a goose-neck condenser, there is added 1400 grams (about 6 moles) of phthalic anhydride, 80 grams of trimellitic anhydride (about 0.4 moles) and 2680 grams (20 moles) of trimethylolpropane. The mixture is heated to 190° C. with stirring and kept at this temperature until the acid number is 5. The reaction product (an ester polyol composition) is then cooled to room temperature and analyzed. The hydroxyl number is found to be 555. The brown product is a gel-like material at 25° C. which contains compounds with the structural formula:

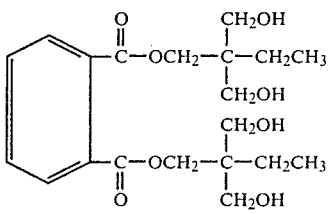

Example BB

A specimen of a phthalic anhydride-trimellitic anhydride composition is prepared by blending substantially pure stocks to produce a composition comprising (total composition basis):

(a) about 65 weight percent of phthalic anhydride, and (b) about 35 weight percent of trimellitic anhydride.

This composition has an hydroxyl number estimated to be about 0 and an acid number estimated to be about 800. This composition is a solid at room temperatures and is prepared in a pulverized form.

To a three-liter, four-neck, round-bottom flask equipped with a stirrer, thermometer, nitrogen inlet tube and a goose-neck condenser there is added at ambient temperature and pressure 518 grams (about 3.5 moles) of the above phthalic anhydride and 288 grams (about 1.5 moles) of trimellitic anhydride in a pulverized form followed by 1219 grams (about 11.5 moles) of diethylene glycol. The mixture is heated to 205° C. and kept at this temperature until the acid number of the reactant mixture is found to be not more than 6.0, and then sufficient diethylene glycol is removed from the reaction zone to achieve the final product hydroxyl and viscosity values. The reaction product is an ester polyol composition which, when cooled to room temperature, is a liquid that is found to have an hydroxyl number of about 300 and a viscosity of about 3000 centipoises at 25° C. measured using a Brookfield viscometer (model RVF) with a #6 spindle operating at about 10 rpm.

Example CC

For comparison purposes, a substantially pure diethylene glycol phthalate polyester polyol is prepared as follows:

Phthalic anhydride believed to be of 99.7 weight percent purity (total composition basis) having a hydroxyl number of about 0 and an acid number of about 750 is obtained and 746 grams thereof (about 5 moles) is charged to a three-liter, four-neck, round-bottom flask equipped with a stirrer, thermometer, nitrogen inlet tube, and a goose-neck condenser at ambient temperature and pressure, followed by 1060 grams (about 10 moles) of diethylene glycol. This mixture is heated to 239° C. and kept at this temperature until the acid number of the reaction mixture is found to be about 2.9 (about 4 hours). The reaction product is believed to comprise diethylene glycol phthalate and is in the form of a pale yellow liquid at room temperature having an hydroxyl number of about 323 and a viscosity of about 2500 centipoises at 25° C. measured using a Brookfield viscometer (model RVF) with a #6 spindle operating at about 10 rpm. The reaction product has a saponification value of 319, an ester value of 316, and an unknown acetone insolubles content of 4.24 weight percent (100 weight percent total product basis). This reaction product also contains about 13.1 weight percent (total weight basis) of diethylene glycol.

Example DD

For comparison purposes, a substantially pure diethylene glycol trimellitate polyester polyol is prepared as follows:

To a three-liter, four-neck, round-bottom flask equipped with a stirrer, thermometer, nitrogen inlet tube and a goose-neck condenser there is added at ambient temperature and pressure 384 grams (about 2 moles) of trimellitic anhydride in a pulverized form followed by 636 grams (about 6 moles) of diethylene glycol. The mixture is heated to 220° C. and kept at this temperature until the acid number of the reactant mixture is found to be not more than 1.0, and then sufficient diethylene glycol is removed from the reaction zone to achieve the final product hydroxyl and viscosity values. The reaction product is an ester polyol composition which, when cooled to room temperature, is a liquid that is found to have an hydroxyl number of about 322 and a viscosity of about 110000 centipoises at 25° C. measured using a Brookfield viscometer (model LVT) with a #3 spindle operating at about 0.6 rpm.

Example EE

A specimen of a phthalic anhydride-trimellitic anhydride composition is prepared by blending substantially pure stocks to produce a composition comprising (total composition basis):

(a) about 95 weight percent of phthalic anhydride, and (b) about 5 weight percent of trimellitic anhydride.

Using a three-liter, four-neck, round-bottom flask equipped with a stirrer, thermometer, nitrogen inlet tube and a goose-neck condenser and by following an appropriately modified procedure as described in Example BB. there is produced a reaction product which is an ester polyol composition which, when cooled to room temperature, is a liquid that is found to have an hydroxyl number of about 300 and a viscosity not above about 3000 centipoises at 25° C. measured using a Brookfield viscometer (model RVF) with a #6 spindle operating at about 10 rpm.

Example FF

A specimen of a phthalic anhydride-trimellitic anhydride composition prepared by blending substantially pure stocks to produce a composition comprising (total composition basis):

(a) about 50 weight percent of phthalic anhydride, and (b) about 50 weight percent of trimellitic anhydride.

Using a three-liter, four-neck, round-bottom flask equipped with a stirrer, thermometer, nitrogen inlet tube and a goose-neck condenser and by following an appropriately modified procedure as described in Example BB, there is produced a reaction product which is an ester polyol composition which, when cooled to room temperature, is a liquid that is found to have an hydroxyl number of about 300 and a viscosity about 3000 centipoises at 25° C. measured using a Brookfield viscometer (model RVF) with a #6 spindle operating at about 10 rpm.

EXAMPLES OF THE POLYOL AND RESIN BLENDS OF THE INVENTION

Example I

The product of Example A (34 parts) is blended by mechanically mixing with 13 parts of "Triton X-100" available commercially from Rohm & Haas. The Brookfield viscosity of this blend is found to be 800 cps 25° C. The hydroxyl number is 250.

Example II

By using the blending procedure of Example I, various prior art polyols are blended with various products above-identified to produce resin blends. The polyols used and the product blends obtained are summarized in Table XIII below along with poly blend properties (or characteristics).

TABLE XIII

| | Blend Designation (% by weight on a 100 wt % percent total basis) | | | | | |
|---|---|---|---|---|---|---|
| Ingredients | A | B | C | D | E | F |
| Polyol Example A[1] | 30 | | | | | 40 |
| Polyol Example J[2] | | 40 | | | | |
| Polyol Example S[3] | | | 80 | | | |
| Polyol Example D | | | | 70 | | |
| Polyol Example T | | | | | 80 | |
| VORANOL RS-370[4] | 70 | | | | | |
| NIAX polyol LHT-240[5] | | 60 | | | | |
| TRITON X-100[6] | | | 20 | | 20 | |
| Ethoxylated Cocoamide[7] | | | | 30 | | |
| Thanol R-350X[8] | | | | | | 60 |
| Viscosity, cps 25° C. | 25,000 | 300 | 1000 | 3000 | 1200 | 7500 |
| Hydroxyl Number | 345 | 372 | 364 | 298 | 205 | 440 |

TABLE XIII footnotes:
[1]Examples B through H are materials that behave similarly to A.
[2]Examples K through Q are materials that behave similarly to J.
[3]Examples T through Z are materials that behave similarly to S.
[4]A trademark for propoxylated sucrose (Dow Chemical Company).
[5]Propoxylated glycerine - Union Carbide Corp.
[6]A trademark for ethoxylated octylphenol - Rohm & Haas.
[7]Ethoxylated cocoamide, Amidox C5, Stepan Chemical Company.
[8]Propoxylated Mannich base of phenol, diethanolamine, and formaldehyde, Texaco Chemical Company.

RESIN PRECURSOR BLENDS

Example III

The polyblend of Example I is blended with a mechanical mixer with a catalyst system, a blowing agent, and an emulsifier system to produce a resin precursor suitable for making a polyurethane foam through reaction with an isocyanate reactant.

The catalyst system used here is 2,4,6-(tridimethylaminomethyl)phenol available commercially from Rohm & Haas under the trade designation "DMP-30". Dabco TMR-2 is also used as a catalyst commercially available from Air Products Co.

The blowing agent used here is Freon 11B which is trichlorofluoromethane available commercially from E. I. du Pont de Nemours & Company under the trademark "Freon 11B".

The Freon compatibilizing agent used here is "Triton X-100" which is available commercially from Rohm & Haas.

The product resin prepolymer precursor blend is a liquid at room temperature and has a viscosity of 400 cps at 25° C. This product has the following composition:

| | |
|---|---|
| Polyester polyol (Example A) | 34 |
| DC-193 | 2 |
| Triton X-100 | 13 |
| Fyrol PCF | 14 |
| DABCO TMR-2 | 2 |
| DMP-30 | 1 |
| Freon 11B | 34 |

Examples IV (A,B,C,D)

By using the procedure of Example III above, various resin precursor blends are prepared as summarized in Table XIV below:

TABLE XIV

| | Example Identification | | | |
|---|---|---|---|---|
| Component | A | B | C | D |
| Compound Example BB | 34 | | | |
| Compound Example CC | | 34 | 22 | |
| Compound Example DD | | | 12 | 34 |
| DC-193 | 2 | 2 | 2 | 2 |
| Triton X-100 | 13 | 13 | 13 | 13 |
| Fyrol PCF | 14 | 14 | 14 | 14 |
| Dabco TMR-2 | 2 | 2 | 2 | 2 |
| DMP-30 | 1 | 1 | 1 | 1 |
| Freon 11B | 34 | 34 | 34 | 34 |
| Viscosity, cps 25° C. | 300 | 200 | 800 | 1000 |

In the foregoing Table, the results indicate that, in the Examples identified above as C and D, the Freon 11B is substantially incompatible as shown by the fact that each of these resulting formulations are cloudy. However, in the Examples identified above as A and B, the Freon 11B is fully soluble as shown by the fact that each of these resulting formulations is clear. Observe that even at only a 12% level of trimellitic reaction product the fluorocarbon is insoluble in this blend. Observe also that, in the present formulations, the Triton X-100 is used to improve fluorocarbon solubility. When the Triton X-100 is eliminated, the fluorocarbon solubility in a resulting blend is substantially reduced particularly in trimellitate-containing polyester polyol containing polyol blend.

The solubility of Freon 11B in a sample of Example DD is found to be very small.

The solubility of Freon 11B in a sample of Example FF is somewhat greater than in Example DD material but is still so slight as to be of little practical consequence in a resin prepolymer blend.

The solubility of Freon 11B in a sample of Example BB is greater than in Example FF material and is believed to be sufficiently high to be of practical consequence in commercial-quality resin prepolymer blends.

The solubility of Freon 11B in a sample of Example EE is greater than in Example BB material.

In polyol blends made by prereacting mixtures of phthalic anhydride and trimellitic anhydride with a polyol such as diethylene glycol, it appears that fluorocarbon solubility increases generally as trimellitic anhydride content declines from about 35 to 5 weight percent in accordance with the teachings of this invention.

The solubility of Freon 11B in blends prepared by mixing together separately prepared blends of (a) reaction product of substantially pure phthalic anhydride with diethylene glycol such as Example CC with (b) reaction product of substantially pure trimellitic anhydride with diethylene glycol such as Example DD in proportions to approximate the respective levels of trimellitate in each of Examples BB, EE, and FF reveals that in each instance, the Freon 11B is appreciably less soluble in these esters and post-mixed blends than in the corresponding premixed and esterified blends of such Examples. In fact, the Freon 11B is substantially completely incompatible with such prepared blends so that such blends are not practical for use in making resin prepolymer blends. Thus, it is concluded that the addition of the trimellitic diethylene glycol reaction product separately prepared to the phthalic anhydride-diethylene glycol reaction product separately prepared leads to a product mixed blend wherein the fluorocarbon blowing agent is essentially incompatible. However, in contrast, in a polyol blend of the present invention where a preformed mixture of phthalic anhydride and trimellitic anhydride is reacted with diethylene glycol to produce a polyester polyol, the solibility of the fluorocarbon blowing agent is markedly improved.

Example V

The resin prepolymer precursor of component A of Table XIV is admixed using a high speed drill press motor equipped with a stirrer blade with a polymeric isocyanate to produce a foam. The polymeric isocyanate here used for reaction with the resin precursor (60 parts isocyanate/40 parts resin precursor) is Mondur MR (which is available commercially from Mobay Chemical Company).

The product foam produced is characterized by a very fine cell structure with no surface friability and high load bearing properties.

Example VI (A,B,C,D,E,F,G,H)

By following the procedure of Example V, additional polyurethane and polyisocyanurate foams are prepared. The material used and the product foam characteristics are summarized in Tables XV and XVI below.

TABLE XV

| Component | Example Identification | | | |
|---|---|---|---|---|
| | A | B | C | D |
| Compound Example A | 34 | 44 | 19 | 49 |
| Thanol R-350X[1] | | | 29 | |
| Thanol R-650X[2] | | | | 11.2 |
| Triton X-100[3] | 13 | | | |
| Ethoxylated cocoamide[4] | | 16 | | |
| DC-193[5] | 2 | 3 | 1 | 1.3 |
| Fyrol PCF[6] | 14 | | 15 | |
| DABCO TMR-2[7] | 2 | 3 | | |
| DMP-30[8] | 1 | 1 | | |
| Freon 11B[9] | 34 | 33 | 32 | 27.3 |
| 50% potassium octoate | | | 4 | |
| Fyrol 6[10] | | | | 11.2 |
| Weight ratio A/B[11] | 60/40 | 66/34 | 61/39 | 38/62 |
| Density, pcf | 1.97 | 2.02 | 2.06 | 1.61 |
| Compressive strength (measured parallel to rise), psi | 35.5 | 34.4 | 34 | 21 |
| (measured perpendicular to rise), psi | 16.0 | 12.0 | 17 | 10 |

TABLE XV footnotes:
[1] Propoxylated Mannich base of phenol, diethanolamine, and formaldehyde - Texaco Chemical Company.
[2] Propoxylated Mannich base of nonylphenol, diethanolamine, and formaldehyde - Texaco Chemical Company.
[3] Ethoxylated octylphenol - Rohm & Haas.
[4] Available commercially as "Amidox C5" from Stepan Chemical Company.
[5] Dimethylpolysiloxane, polyalkylene oxide copolymer - Dow Corning.
[6] Tris$\beta$-chloropropylshosphate-Stauffer Chemical Company.
[7] Polyisocyanurate catalyst - Air Products.
[8] 2,4,6-tri(dimethylaminomethyl) phenol.
[9] Trichlorofluoromethane.
[10] Diethyl-n,n'-diethanolaminomethylphosphonate
[11] This ratio designates weight ratio of isocyanate (designated as "A") to the weight ratio of resin formulation containing polyol product of Ex. A (designated as "B").

The following Examples E, F, G and H illustrate progressive changes in foam properties achieved with incremental changes in trimellitate ester content, as desired, in accord with the teachings of this invention.

TABLE XVI

| Component | Example Identification | | | |
|---|---|---|---|---|
| | E | F | G | H |
| Compound Example A | 34 | | | |
| Compound Example E | | 34 | | |
| Compound Example H | | | 34 | |
| Compound Example B | | | | 34 |
| DC 193 | 2 | 2 | 2 | 2 |
| Triton X-100 | 13 | 13 | 12 | 13 |
| Fyrol PCF | 14 | 14 | 14 | 14 |
| DABCO TMR-2 | 2 | 2 | 2 | 2 |
| DMP - 30 | 1 | 1 | 1 | 1 |
| Freon 11B | 34 | 34 | 34 | 34 |
| wt. ratio A/B | 60/40 | 60/40 | 60/40 | 60/40 |
| Density lbs/ft$^3$[1] | 1.97 | 2.10 | 2.00 | 1.98 |

[1] With an increase in the trimellitate content of the polyester polyol, the compressive strength and dimensional stability of the foam become progressively better.

Example VII (A,B,C,D,E)

Samples identified as A, B, C, and D are of the ester polyol of Example A and a sample identified as E of Example CC are each blended with various of the ingredients shown in Table XVII below to produce resin blends. Then a portion of each respective resin blend is admixed using a high speed drill press motor equipped with a stirrer blade with a polymeric isocyanate (polymethylene polyphenylisocyanate), Mondur MR from Mobay Chemical Co., to produce a polyurethane-polyisocyanurate type foam.

The product foam produced in each case is characterized by a very fine cell structure with minimal surface friability and high load bearing properties which is considered surprising in the case of the foams made with the resin blends A, B, C, and D that are derived from a product ester polyol composition of this invention. The compositions used are summarized in Table XVII below.

The product foam from resin blend E contains only the diethylene glycol phthalate of Example CC. This product foam is similar in its properties to the product foam from the resin blend A which, like the resin blend E, is believed to contain very little diethylene glycol. In order to dissolve the fluorocarbon blowing agent ("Freon 11B") in each of the resin blends A and E, it is necessary to use more ethoxylated octyl phenol ("Triton X-100") than is needed to dissolve the same fluorocarbon blowing agent in each of the resin blends B, C, and D which each contain diethylene glycol. The ethoxylated octyl phenol and the diethylene glycol are believed to function as compatibility agents in these resin blends.

The resin blends B, C, and D are easier to produce compared to the blends A and E apparently because the presence of the diethylene glycol in the case of blends B, C, and D aids in the blending operation.

When combined with the isocyanate, each of the resin blends B, C, and D exhibits a shorter initial cream time and a shorter tack free time than do the respective resin blends A and E for comparable catalyst quantities.

Considering each of the product foams produced, those foams resulting from resin blends B, C, and D appear to have a better blush and less friability then do those foams resulting from resin blends A and E.

TABLE XVII

| Component | Resin Blend Formulation | | | | | |
|---|---|---|---|---|---|---|
| | A | B | C | D | E | F |
| Ester Polyol, Example A | 32.6 | 29.4 | 46.0 | 42.6 | — | — |
| Ester Polyol, Example CC | — | — | — | — | 34.0 | — |
| Ester Polyol, Example BB | — | — | — | — | — | 28.0 |
| Diethylene glycol | — | 5.2 | 2.4 | 5.8 | — | 5.0 |
| "DC-193"[1] | 2.0 | 2.0 | 2.6 | 2.6 | 2.0 | 1.9 |
| "Triton X-100"[2] | 14.7 | 12.7 | — | — | 13.0 | 16.8 |
| "Antiblaze 80"[3] | 12.6 | 12.6 | — | — | 14.0 | 13.4 |
| "DABCO TMR-2"[4] | 2.0 | 2.0 | — | — | 2.0 | 1.9 |
| "DMP-30"[5] | 0.5 | 0.5 | — | — | 1.0 | 0.5 |
| "Catalyst T-45"[6] | 1.5 | 1.5 | — | — | — | — |
| "Freon 11B"[7] | 34.1 | 34.1 | 31.5 | 31.5 | 34.0 | 32.5 |
| "Curithane 97"[8] | — | — | 5.4 | 5.4 | — | — |
| "Varonic K-215"[9] | — | — | 12.1 | 12.1 | — | — |
| Weight Ratio A/B[10] | 60/40 | 60/40 | 60/40 | 58.1/41.9 | 60/40 | 50/50 |
| Density, pcf | 2.10 | 2.23 | 1.7 | 1.8 | 1.86 | 2.03 |

Table XVII footnotes:
[1]"DC-193" is a trademark for dimethylpolysiloxane, polyalkylene oxide copolymer available commercially from Dow Corning.
[2]"Triton X-100" is a trademark for ethoxylated octylphenol available commercially from Rohm and Haas believed to contain about 10-15 combined moles of ethylene oxide per molecule.
[3]"Antiblaze 80" is a trademark for this (-βchloropropyl) phosphate available commercially from Mobil Chemical Company.
[4]"DABCO TMR-2" is a trademark for polyisocyanurate catalyst available commercially from Air Products Company.
[5]"DMP-30" is a trademark for 2,4,6-tri-(dimethylaminomethyl) phenol available commercially from Rohm and Haas.
[6]"Catalyst T-45" is a trademark for 50% potassium octoate in dipropylene glycol available commercially from M & T Chemicals.
[7]"Freon 11B" is a trademark for trichlorofluoromethane available commercially from E. I. duPont de Nemours and Company.
[8]"Curithane 97" is a trademark for polyisocyanurate catalyst available commercially from Upjohn Company.
[9]"Varonic K-215" is a trademark for ethoxylated cocoamine available commercially from Sherex Chemical Company.
[10]This ratio designates the weight ratio of isocyanate (designated as "A") to the weight ratio of resin formulation containing polyol product of Example 1 (designated as "B").

The hydroxyl number of each of the resin blends B, C, and D is greater than the hydroxyl number of each of the resin blends A and E which is believed to be a consequence of the presence of the higher concentration of diethylene glycol in such resin blends B, C, and D.

By changing the weight ratio of isocyanate to resin formulations from those shown in Table XVII above to a value of about 50/50, product polyurethane-type foams of each such resin blend A through E are produced. Each product foam likewise has a very fine cell structure with minimal surface friability and high load bearing properties.

Example VIII

A heated specimen of a phthalic anhydride bottoms composition having (a) a phthalic anhydride content of about 60 weight percent (total composition basis), (b) a hydroxyl number estimated to be about zero, and (c) an acid number estimated to be about 500 is charged to a 60 gallon stainless steel reactor equipped with an agitator, thermocouple for measuring temperature, nitrogen inlet tube, and a distillation column. To the reactor is added at ambient pressure 133 pounds (about 1 pound mole) of such above-identified phthalic anhydride bottoms 15 pounds trimellitic anhydride (about 0.08 pound moles) and 328 pounds (about 3.09 pound mole) of diethylene glycol. The mixture is heated to 223° C. and kept at this temperature until the acid number of the reactant mixture is found to be about 5.5 (about 14 hours). The reaction product (an ester polyol composition) is then cooled to ambient temperature, and hydroxyl number, and viscosity values thereof are determined. The hydroxyl number is found to be about 329, and the viscosity of the black liquid product is found to be about 15,500 centipoises at 25° C. measured using Brookfield viscometer (model RVF) with a #6 spindle at a speed of 10 rpm. Ester polyol composition being characterized by containing organic compounds at least 50 weight percent (on a 100 weight percent total composition basis) of which have aromatic nuclei, at least two terminal hydroxyl groups per molecule, and at least two ester groups per molecule. This reaction product is believed to contain about 10.6 weight percent (total composition basis) of unreacted diethylene glycol. In addition, this reaction product had a content of unknown acetone insolubles of about 35 weight percent (total composition basis) and a saponification value of about 380 (both measured as described in footnotes of Table VI above).

This product behaves similarly to the product of Example A with respect to its foam forming characteristics.

Example IX

A heated specimen of a phthalic anhydride bottoms composition having (a) a phthalic anhydride content of about 60 weight percent (total composition basis), (b) a hydroxyl number estimated to be about zero, and (c) an acid number estimated to be about 500 is charged to a 60 gallon stainless steel reactor equipped with an agitator, thermocouple for measuring temperature, nitrogen inlet tube, and a distillation column. To the reactor is added at ambient pressure 183 pounds (about 1 pound mole) of such above-identified phthalic anhydride bottoms 46 pounds of trimellitic anhydride (about 0.24 lb.moles) and 305 pounds (about 2.88 pound mole) of diethylene glycol. the mixture is heated to 225° C. and kept at this temperature until the acid number of the reactant mixture is found to be about 4 (about 15 hours). The reaction product (an ester polyol composition) is then cooled to ambient temperature, and hydroxyl number, and viscosity values thereof are determined. The hydroxyl number is found to be about 320, and the viscosity of the black liquid product is found to be about 16,800 centipoises at 25° C. measured using a Brookfield viscometer (model RVF) with a #6 spindle at a speed of 10 rpm. Ester polyol composition being characterized by containing organic compounds at least 50 weight percent (on a 100 weight percent total composition basis) of which have aromatic nuclei, at least two terminal hydroxyl groups per molecule, and at least two ester groups per molecule. The reaction product is believed to contain about 15.8 weight percent (total composition basis) of unreacted diethylene glycol. In addition, this reaction product had a content of unknown acetone insolubles of about 15.6 weight percent (total composition basis) and a saponification value of about 317 (both measured as described in footnotes of Table VI above).

This product behaves similarly to the product of Example A with respect to its foam forming characteristics.

The products of Examples A–H, and VIII and IX are analyzed further, and the combined results are shown in Table XVIII below. Liquid chromatographic analysis confirms the qualitative similarity between the respective compositions of Examples A–I and VIII and IX.

When other polyols of formula (1), such as ethylene glycol, tetraethylene glycol, glycerine, pentaerythritol, and 2,2,-dimethyl-1,3,-propane diol, are reacted with a starting phthalic anhydride bottoms composition, product ester polyol compositions are produced which can be formulated with blowing agent and catalyst to produce resin blends that can then be reacted with isocyanate to produce useful foams.

Having now fully described the invention, it will be apparent to one of ordinary skill in the art that many changes and modifications can be made thereto without departing from the spirit or scope of the invention as set forth herein.

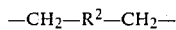

$R^2$ is a radical selected from the group consisting of:

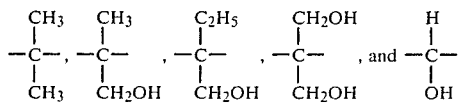

(c) radicals of the formula:

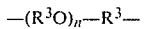

$R^3$ is an alkylene radical containing from 2 through 3 carbon atoms and n is an integer of from 1 through 3, (B) from about 50 to 95 weight percent of phthalate condensates of said aliphatic polyol with aromatic dicarboxylic acid material selected from the group consisting of phthalic acid and phthalic acid anhydride, and

TABLE XVIII

| Ident. No. | Component or Property | Magnus Polyol of Example No. | | | | | | | | | | |
|---|---|---|---|---|---|---|---|---|---|---|---|---|
| | | A | B | C | D | E | F | G | H | I | VIII | IX |
| 1 | diethylene glycol content (wt %) | 15.6 | 3.4 | 6.6 | 16.5 | 13.9 | 12.7 | 19.6 | 19.0 | — | 10.6 | 15.8 |
| 2 | hydroxyl number | 312 | 226 | 215 | 324 | 310 | 300 | 335 | 390 | 565.2 | 329 | 320 |
| 3 | acid number | 7.0 | 0.5 | 5.5 | 6.0 | 4.5 | 1.0 | 5.0 | 2.5 | — | 5.5 | 4.4 |
| 4 | saponification number | 323 | 365 | 323 | 302 | 304 | 321 | 298 | 306 | — | 380 | 317 |
| 5 | ester value[1] | 316 | 364.5 | 317.5 | 296 | 299.5 | 320 | 293 | 303.5 | — | 374.5 | 312.6 |
| 6 | unknown acetone insolubles content (wt %) | 18.2 | 24.3 | 11.3 | 11.7 | 7.2 | 14.7 | 12.2 | 11.1 | 10–20 | 35.0 | 15.6 |
| 7 | viscosity, cps | 25000 | 61000 | 137000 | 19000 | 16000 | 28000 | 24800 | 14000 | — | 15000 | 16800 |
| 8 | 1,1,1-trimethylol propane content (wt %) | — | — | — | — | — | — | — | — | 2–15 | — | — |
| 9 | mole ratio of bottoms to polyol[2] | 1:3.1 | 1:3.1 | 1:3.1 | 1:3.1 | 1:3.1 | 1:3.1 | 1:3.1 | 1:3.1 | 1:3.1 | 1:3.1 | 1:3.3 |

Table XVIII footnotes:
[1]The term "ester value" references the number of milligrams of potassium hydroxide needed to react with the ester groups present in one gram of sample minus the number of milligrams of potassium hydroxide required to neutralize the acid material present in one gram of sample.
[2]The term "mole ratio of bottoms to polyol" references the calculated molar quantity of carboxylic compounds to formula (1) polyol molar quantity in any given example. The carboxylic compounds are assumed to be a 50/20 ratio of phthalic anhydride to trimellitic anhydride.

As is apparent from the foregoing specification, this invention is susceptible to being embodied with various alterations and modifications which may differ particularly from those that have been described and illustrated in the preceding specification. For this reason, it is to be fully understood that all of the foregoing specifications are merely illustrative and nothing is to be construed or interpreted as being restrictive or otherwise limiting of this scope of the present invention except as such is set forth and defined in the following claims.

We claim:

1. A homogeneous liquid polyol blend composition comprising on a 100 weight percent total blend basis:
(A) from about 2 to 25 weight percent of at least one aliphatic polyol of the generic formula:

$$HO-R^1-OH \quad (1)$$

wherein
$R^1$ is a divalent radical selected from the group consisting of:
(a) alkylene radicals each containing from two through six carbon atoms,
(b) radicals of the formula:

(C) from about 5 to 35 weight percent of trimellitate condensates of said aliphatic polyol with aromatic tricarboxylic acid material selected from the group consisting of trimellitic acid and trimellitic acid anhydride, said polyol blend composition having been prepared by heating a starting blend comprised on a 100 wt % total blend basis of
(A) from about 50 to 95 weight percent of aromatic dicarboxylic acid material selected from the group consisting of phthalic acid anhydride and phthalic acid; and
(B) from about 5 to 35 weight percent of an aromatic tricarboxylic acid material selected from the group consisting of trimellitic acid anhydride and trimellitic acid with at least one aliphatic polyol having the generic formula:

$$HO-R^1-OH$$

wherein $R^1$ is as above defined, the initial mole ratio of said aliphatic polyol to said blend being in the range from about 1.9 to 4, said heating being conducted under liquid phase conditions at a temperature ranging from about 150° to 270° C. until the resulting product mixture reaches an hydroxyl number in the range from about 190 to 600 and an acid number in the range from about 0.01 to 7.

2. The liquid polyol blend composition of claim 1 wherein the total weight percent of unknown acetone insoluble material present therein is not more than about 15 weight percent.

3. The liquid polyol blend composition of claim 1 additionally containing from 0 to 12 weight percent on a total polyol blend basis of benzoate condensates of said aliphatic polyol with aromatic monocarboxylic acid material selected from the group consisting of benzoic acid and benzoic acid anhydride, and said aromatic monocarboxylic acid material is additionally present in said starting blend in an amount ranging from 0 up to about 12 weight percent on a total starting blend basis.

4. The liquid polyol blend composition of claim 1 wherein said aliphatic polyol comprises diethylene glycol.

5. The liquid polyol blend composition of claim 1 wherein said polyol blend composition contains on a 100 weight percent total blend basis:
   (i) from about 3 to 20 weight percent of said aliphatic polyol,
   (ii) from about 55 to 93 weight percent of said phthalate condensates,
   (iii) from about 8.5 to 33 weight percent of said trimellitate condensates, and
   (iv) from 0 to about 2 weight percent of said benzoate condensates,
and said polyol blend composition further contains not more than about 10 weight percent of unknown acetone insolubles.

6. A homogeneous liquid resin prepolymer blend composition for reaction with an organic isocyanate comprising on a 100 weight percent total basis:
   (A) from about 5 to 80 weight percent of a polyol blend composition of claim 1,
   (B) from about 18 to 40 weight percent of a fluorocarbon blowing agent,
   (C) from 0 to about 4 weight percent of water,
   (D) from about 0.2 to 4 weight percent of a silicone cell stabilizing surfactant.
   (E) from about 0.5 to 8 weight percent of a urethane forming and/or isocyanurate forming catalyst,
   (F) from about 5 to 35 weight percent additional quantity of said aliphatic polyol of claim 1.

7. The resin blend of claim 6 wherein said silicone cell stabilizing surfactant is a dimethyl polysiloxane-polyalkylene oxide copolymer.

8. The resin blend composition of claim 6 additionally containing from 0 to about 30 weight percent of at least one nonionic surfactant which is substantially completely soluble in said polyol blend and which has an hydroxyl value of from about 85 to 100.

9. The resin blend composition of claim 8 wherein said surfactant is an alkoxylated alkyl phenol containing one hydroxyl group per molecule.

10. The resin blend composition of claim 6 additionally containing from 0 to about 30 weight percent of at least one nonionic surfactant compound which has an hydroxyl value of from about 250 to 350, and which is substantially completely soluble in said polyol blend.

11. The resin blend composition of claim 10 wherein said nonionic surfactant is an ethoxylated cocoamide containing two hydroxyl groups per molecule.

12. A cellular foam produced by reacting a resin blend of claim 6 with an organic isocyanate.

13. The polyol blend composition of claim 4 wherein:
(1) of said phthalate condensates, at least about 15 weight percent thereof on a 100 weight percent total polyol blend basis are comprised of a total of
   (a) esters wherein the combined mole ratio of said aromatic dicarboxylic acid material to said aliphatic polyol is 1:1;
   (b) esters wherein the combined mole ratio of said aromatic dicarboxylic acid material to said aliphatic polyol is 1:2;
   (c) esters wherein the combined mole ratio of said aromatic dicarboxylic acid material to said aliphatic polyol is 2:3; and
(2) of said trimellitate condensates at least about 15 weight percent thereof on a 100 weight percent total polyol blend basis are comprised of a total of
   (a) esters wherein the combined mole ratio of said aromatic tricarboxylic acid material to said aliphatic polyol is 1:1;
   (b) esters wherein the combined mole ratio of said aromatic tricarboxylic acid material to said aliphatic polyol is 1:2;
   (c) esters wherein the combined mole ratio of said aromatic tricarboxylic acid material to said aliphatic polyol is 1:3; and
(3) at least about 5 weight percent of said phthalate condensates and at least about 5 weight percent of said trimellitate condensates, all on a 100 weight percent total polyol blend basis, are comprised of oligomers of said aliphatic polyol with said dicarboxylic acid material, said tricarboxylic material, and mixtures thereof.

* * * * *